United States Patent
Sato et al.

(10) Patent No.: US 10,135,248 B2
(45) Date of Patent: Nov. 20, 2018

(54) CONTROL APPARATUS, CONTROL SYSTEM, CONTROL METHOD, AND RECORDING MEDIUM FOR CONTROLLING DEVICES TO CHARGE OR DISCHARGE ELECTRICITY STORAGE APPARATUS

(71) Applicant: Mitsubishi Electric Corporation, Tokyo (JP)

(72) Inventors: Kaori Sato, Tokyo (JP); Hirotoshi Yano, Tokyo (JP); Masaaki Yabe, Tokyo (JP); Satoshi Minezawa, Tokyo (JP); Satoshi Endo, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 15/118,906

(22) PCT Filed: Apr. 16, 2015

(86) PCT No.: PCT/JP2015/061718
§ 371 (c)(1),
(2) Date: Aug. 15, 2016

(87) PCT Pub. No.: WO2015/159951
PCT Pub. Date: Oct. 22, 2015

(65) Prior Publication Data
US 2017/0324246 A1 Nov. 9, 2017

(30) Foreign Application Priority Data
Apr. 16, 2014 (WO) .................. PCT/JP2014/060834

(51) Int. Cl.
*G05D 3/12* (2006.01)
*H02J 3/32* (2006.01)
(Continued)

(52) U.S. Cl.
CPC .............. *H02J 3/32* (2013.01); *H01M 10/44* (2013.01); *H02J 3/382* (2013.01); *H02J 7/0065* (2013.01);
(Continued)

(58) Field of Classification Search
None
See application file for complete search history.

(56) References Cited

U.S. PATENT DOCUMENTS 8,583,288 B1 * 11/2013 Rossi ................. G05D 23/1917
700/276
2002/0103745 A1 * 8/2002 Lof ........................ G06Q 40/04
705/37
(Continued)

FOREIGN PATENT DOCUMENTS

EP    2 797 198 A1    10/2014
JP    2012-130161 A    7/2012
(Continued)

OTHER PUBLICATIONS

Extended European Search Report dated Nov. 21, 2017 issued in corresponding EP application No. 15779254.0.
(Continued)

*Primary Examiner* — Adam Lee
(74) *Attorney, Agent, or Firm* — Posz Law Group, PLC

(57) ABSTRACT

A control apparatus is configured to control a control target device among load devices for which power supply from an electricity storage apparatus is controlled based on total power consumption of the load devices. The control apparatus includes a power monitor and a device controller. The power monitor is configured to acquire a value of the total power consumption of the load devices. The device controller is configured to control the control target device to change the power consumption of the control target device
(Continued)

so that the value of the total power consumption changes to a value having a level where the electricity storage apparatus supplies the power to the load devices when the value of the total power consumption acquired by the power monitor is at a level where the power is not supplied from the electricity storage apparatus to the electrical devices.

18 Claims, 33 Drawing Sheets

(51) Int. Cl.
  *H02J 3/38* (2006.01)
  *H02J 7/00* (2006.01)
  *H02J 7/34* (2006.01)
  *H01M 10/44* (2006.01)
  *H02J 7/35* (2006.01)

(52) U.S. Cl.
  CPC ................ *H02J 7/34* (2013.01); *H02J 7/35* (2013.01); *H02J 2007/0059* (2013.01); *Y02E 70/30* (2013.01)

(56) References Cited

U.S. PATENT DOCUMENTS

| | | | | |
|---|---|---|---|---|
| 2003/0047209 A1* | 3/2003 | Yanai | H02J 3/32 | 136/244 |
| 2004/0070280 A1* | 4/2004 | Nakata | H02J 3/32 | 307/69 |
| 2004/0207207 A1* | 10/2004 | Stahlkopf | H02J 3/32 | 290/44 |
| 2005/0019629 A1* | 1/2005 | Ikuma | H01M 8/04604 | 307/19 |
| 2005/0272402 A1* | 12/2005 | Ferentz | G06F 1/30 | 455/402 |
| 2006/0216555 A1* | 9/2006 | Shige | H01M 8/04223 | 429/429 |
| 2007/0178857 A1* | 8/2007 | Greene | H02J 1/10 | 455/127.1 |
| 2009/0312885 A1* | 12/2009 | Buiel | H02J 3/32 | 700/297 |
| 2009/0315400 A1* | 12/2009 | Howe | H02J 3/14 | 307/39 |
| 2010/0030392 A1* | 2/2010 | Ferentz | H04L 12/10 | 700/295 |
| 2010/0052421 A1* | 3/2010 | Schindler | H02J 1/14 | 307/35 |
| 2010/0264724 A1* | 10/2010 | Nelson | H02J 15/00 | 307/9.1 |
| 2011/0055036 A1* | 3/2011 | Helfan | G06Q 30/04 | 705/26.1 |
| 2011/0077786 A1* | 3/2011 | Vaidyanathan | G01D 4/002 | 700/287 |
| 2011/0077791 A1* | 3/2011 | Yoshii | H02J 3/14 | 700/296 |
| 2012/0004785 A1* | 1/2012 | Son | G01D 4/00 | 700/295 |
| 2012/0007563 A1* | 1/2012 | Muto | B60L 11/1842 | 320/128 |
| 2012/0053742 A1* | 3/2012 | Tsuda | B60L 11/1842 | 700/291 |
| 2012/0066519 A1* | 3/2012 | El-Essawy | H05K 7/1492 | 713/300 |
| 2012/0133333 A1* | 5/2012 | Morioka | H01M 10/441 | 320/134 |
| 2012/0203387 A1* | 8/2012 | Takayama | H01M 10/441 | 700/291 |
| 2012/0242150 A1* | 9/2012 | Ukai | H02J 3/32 | 307/64 |
| 2012/0303987 A1* | 11/2012 | Lee | H02J 3/14 | 713/320 |
| 2013/0013123 A1* | 1/2013 | Ozaki | B60L 11/1842 | 700/295 |
| 2013/0015708 A1* | 1/2013 | Ukita | H02J 3/32 | 307/43 |
| 2013/0026986 A1* | 1/2013 | Parthasarathy | B60L 11/1838 | 320/109 |
| 2013/0049695 A1* | 2/2013 | Baba | H02J 3/32 | 320/128 |
| 2013/0073882 A1* | 3/2013 | Inbaraj | G06F 1/3206 | 713/320 |
| 2013/0110606 A1* | 5/2013 | Seyhan | G06Q 10/06 | 705/14.25 |
| 2013/0138256 A1* | 5/2013 | Sako | H02J 3/14 | 700/286 |
| 2013/0162037 A1 | 6/2013 | Kim et al. | | |
| 2013/0289773 A1* | 10/2013 | Waki | G05F 5/00 | 700/276 |
| 2014/0052308 A1* | 2/2014 | Hanafusa | H02J 3/32 | 700/295 |
| 2014/0052310 A1* | 2/2014 | Baba | G05F 1/66 | 700/297 |
| 2014/0157013 A1* | 6/2014 | Ei-Essawy | H05K 7/1492 | 713/300 |
| 2015/0286234 A1* | 10/2015 | Orlowski | H01M 8/04544 | 307/62 |
| 2016/0241072 A1* | 8/2016 | Naito | H02J 3/32 | |

FOREIGN PATENT DOCUMENTS

| | | |
|---|---|---|
| JP | 2013-017284 | 1/2013 |
| JP | 2013-074689 A | 4/2013 |
| JP | 2013-179736 A | 9/2013 |
| WO | 2013/094396 A1 | 6/2013 |

OTHER PUBLICATIONS

International Search Report of the International Searching Authority dated Jun. 2, 2015 for the corresponding International application No. PCT/JP2015/061718 (and English translation).

\* cited by examiner

FIG.4

| DEVICE ID | OPERATION STATE | POWER CONSUMPTION |
|---|---|---|
| 61 | WATER BOILING | 900-1000 W |
| | KEEP WARM | 300-600 W |
| | REST | 0 W |
| 62 | COOLING | 200-300 W |
| | HEATING | 300-400 W |
| | REST | 0 W |

D2

CONTROL APPARATUS, CONTROL SYSTEM, CONTROL METHOD, AND RECORDING MEDIUM FOR CONTROLLING DEVICES TO CHARGE OR DISCHARGE ELECTRICITY STORAGE APPARATUS

CROSS REFERENCE TO RELATED APPLICATIONS

This application is a U.S. national stage application of International Patent Application No. PCT/JP2015/061718 filed on Apr. 16, 2015, which claims priority to International Patent Application No. PCT/JP2014/060834 filed on Apr. 16, 2014, the disclosures of which are incorporated herein by reference.

TECHNICAL FIELD

The present disclosure relates to a control apparatus, control system, control method, and program.

BACKGROUND ART

Electricity storage apparatuses storing in a storage battery power purchased from a power system or power generated by solar power generation and the like and supplying the power to load devices in a home when necessary are known. With such an electricity storage apparatus, for example, it is possible to store excess power generated by solar power generation and use the stored power at night. Moreover, if the stored power is used during the day when the power demand is high, it is possible to contribute to alleviating the power demand.

Generally, a power system supplies alternating-current (AC) power and the AC power is supplied to load devices in a home. On the other hand, direct-current (DC) power is used for charging/discharging a storage battery. Therefore, the power conditioner of a storage battery constituting an electricity storage apparatus has to convert DC power to AC power and vice versa. When the power is converted, some power is lost as heat because of, for example, the resistance of the converter. In other words, the output power from the power conditioner is smaller than the input power.

Generally, the power conditioner of a storage battery is designed to have the maximum power conversion efficiency at its rated power. Therefore, when the input/output of a power conditioner is small, the power conversion efficiency is lower and the power loss is increased. In response to this, techniques for suppressing the power conversion loss by charging/discharging a storage battery only when the input/output of the power conditioner is large are proposed (for example, see Patent Literature 1 and 2).

The Patent Literature 1 discloses an apparatus that does not charge/discharge a storage battery when the conversion efficiency representing the ratio of the output power to the input power in power conversion is lower than a threshold. Moreover, the Patent Literature 2 discloses an apparatus discharging a storage battery when the result of subtracting the power generation of a distributed power source from the power consumption of load devices exceeds a threshold and stopping discharge of the storage battery when the subtraction result is equal to or lower than the threshold.

CITATION LIST

Patent Literature

Patent Literature 1: International Publication No. WO2013/094396; and

Patent Literature 2: Unexamined Japanese Patent Application Kokai Publication No. 2012-130161.

SUMMARY OF INVENTION

Technical Problem

The apparatuses described in the Patent Literature 1 and 2 do not discharge the storage battery when the power consumed by load devices stays low. In such a case, power conversion with significant power loss is not performed. However, it cannot be said that the electricity storage apparatus is effectively used and this is not preferable. Therefore, there is room for improving the efficiency in operating electricity storage apparatuses.

Moreover, for the apparatuses described in the Patent Literature 1 and 2, no consideration is given in regard to deterioration of the storage battery due to charging/discharging. In this regard, there is room for improving the efficiency in operating electricity storage apparatuses.

The present disclosure is made with the view of the above situation and an objective of the disclosure is to improve the efficiency in operating electricity storage apparatuses.

Solution to Problem

In order to achieve the above objective, the control apparatus of the present disclosure is a control apparatus for controlling a control target device among electrical devices for which supply of power from an electricity storage apparatus is controlled based on total power consumption of the electrical devices, the control apparatus comprising acquisition means for acquiring a value of the total power consumption of the electrical devices, and control means for, when the value of the total power consumption acquired by the acquisition means is at a level where the power is not supplied from the electricity storage apparatus to the electrical devices, controlling the control target device to change power consumption of the control target device so that the value of the total power consumption changes to a value having a level where the electricity storage apparatus supplies the power to the electrical devices.

Advantageous Effects of Invention

According to the present disclosure, the value of the total power consumption of multiple electrical devices is changed to a value with which the electricity storage apparatus supplies power to the multiple electrical devices. As a result, the efficiently in operating the electricity storage apparatus can be improved.

BRIEF DESCRIPTION OF DRAWINGS

FIG. 4 is a chart illustrating device power data;

DESCRIPTION OF EMBODIMENTS

Embodiments of the present disclosure is described in detail hereafter with reference to the drawings.

Embodiment 1

Figure 1:
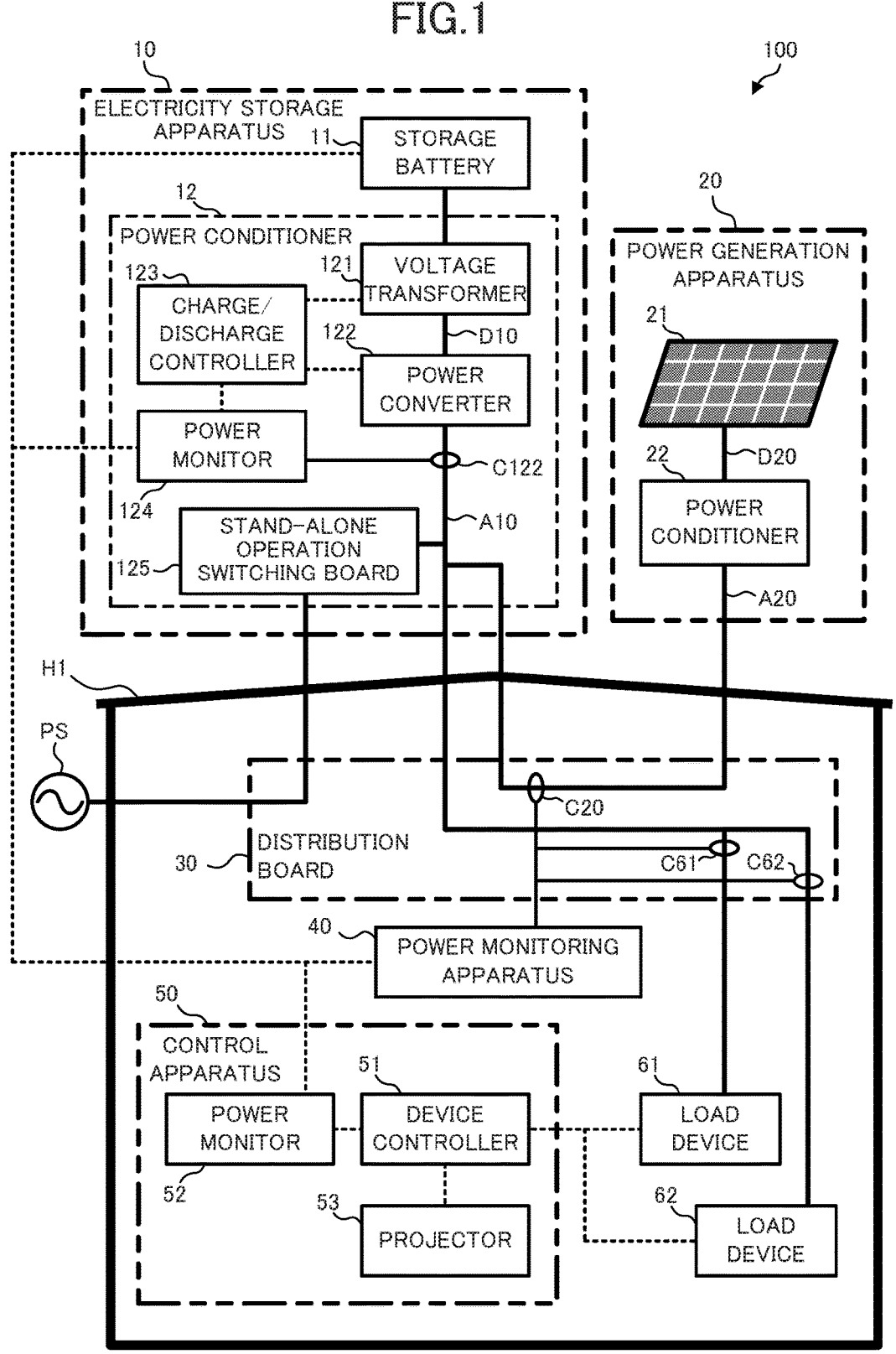
FIG. 1 is a diagram illustrating a configuration of a control system according to Embodiment 1.

FIG. 1 illustrates the configuration of a control system 100 according to Embodiment 1. The control system 100 is a system for controlling devices installed in a home H1 to utilize an electricity storage apparatus 10. The control system 100 includes, as shown in FIG. 1, the electricity storage apparatus 10 that stores power, a power generation apparatus 20 that generates power, a distribution board 30 of the home H1, a power monitoring apparatus 40 that monitors the power generated by the power generation apparatus 20 and the power consumed in the home H1, a control apparatus 50 that controls load devices 61 and 62, and the load devices 61 and 62 that consume power. In FIG. 1, the thick solid lines represent power lines and the thin broken lines represent communication lines (signal lines).

The electricity storage apparatus 10 is an apparatus that stores power supplied from a commercial power source PS and power generated by the power generation apparatus 20. The power stored by the electricity storage apparatus 10 is supplied to the load devices 61 and 62. Moreover, the electricity storage apparatus 10 links the commercial power source PS, power generation apparatus 20, and stored power with each other. The electricity storage apparatus 10 includes a storage battery 11 for storing power and a power conditioner 12 that performs power conversion and the like.

The storage battery 11 is, for example, a secondary battery such as a lead storage battery or lithium ion battery. Moreover, the power conditioner 12 includes a voltage transformer 121 that converts the voltage of DC power, a power converter 122 that performs conversion between DC power and AC power, a charge/discharge controller 123 that controls the voltage transformer 121 and the power converter 122, a power monitor 124 that monitors the AC power input into the power converter 122 or the AC power output from the power converter 122, and a stand-alone operation switching board 125 for operating the electricity storage apparatus 10 independently from the commercial power source PS during a power outage.

The voltage transformer 121 is a DC-DC converter that converts the voltage of DC power. The voltage transformer 121 converts the voltage of DC power supplied from the power converter 122 via a power line D10 to a voltage suitable for the storage battery 11. Then, the voltage transformer 121 supplies the DC power having the changed voltage to the storage battery 11 so as to charge the storage battery 11. Moreover, the voltage transformer 121 converts the voltage of DC power supplied through discharge of the storage battery 11 to a voltage used in the home H1. Then, the voltage transformer 121 supplies the DC power having the changed voltage to the power converter 122 via the power line D10.

Moreover, the voltage transformer 121 includes a switching element for converting the voltage. The voltage transformer 121 converts the voltage when a high level signal is entered into the switching element from the charge/discharge controller 123, and the voltage transformer 121 does not convert the voltage when a low level signal is entered into the switching element from the charge/discharge controller 123.

The power converter 122 is an AC-DC converter that mutually converts AC power flowing through a power line A10 and DC power flowing through the power line D10. The power converter 122 converts AC power supplied from the commercial power source PS or power generation apparatus 20 via the power line A10 to DC power and supplies the DC power to the voltage transformer 121 via the power line D10. Moreover, the power converter 122 converts DC power supplied from the voltage transformer 121 via the power line D10 to AC power and supplies the AC power to the load devices 61 and 62 via the power line A10.

Figure 2:
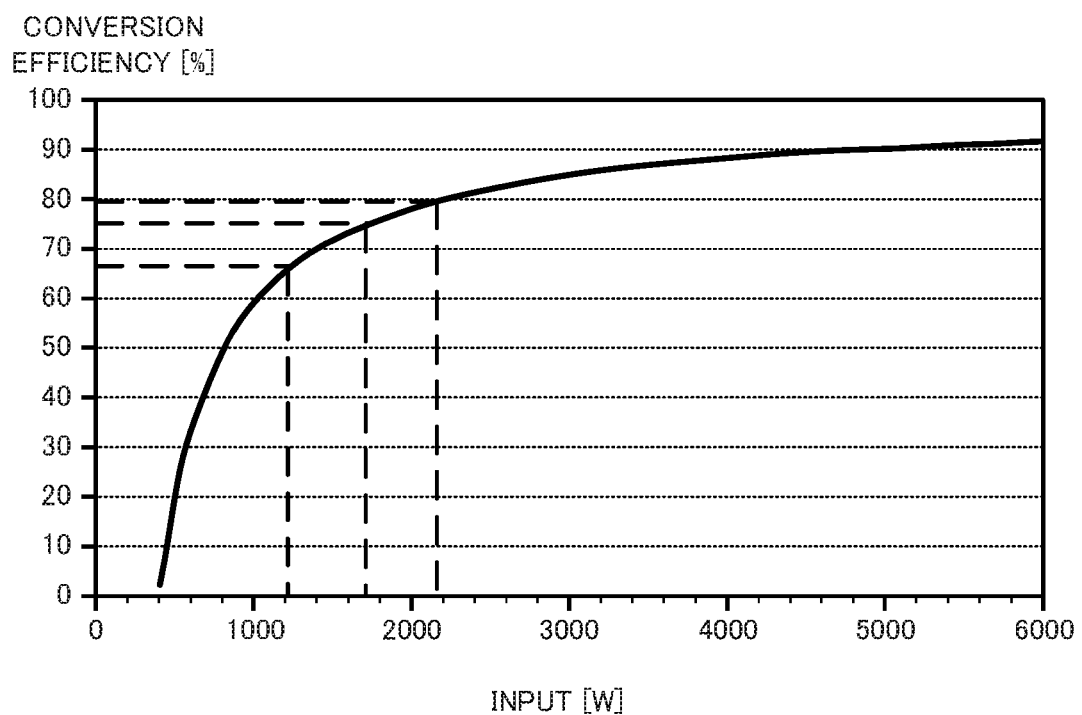
FIG. 2 is a chart illustrating a relationship between power input into a power converter and a conversion efficiency.

FIG. 2 illustrates the relationship between power input into the power converter 122 and a power conversion efficiency of the power converter 122. In FIG. 2, the abscissa represents the value of DC power or AC power input into the power converter 122. Moreover, the conversion efficiency represented on the ordinate means the ratio between the output and input in power conversion by the power converter 122. For example, when approximately 1700 W of AC power or DC power is input into the power converter 122, the conversion efficiency is approximately 75% and approximately 1275 W (=1700 W×0.75) of DC power or AC power is output.

Moreover, the power converter 122 includes a switching element for converting the power. The power converter 122 converts the power when a high level signal is entered into the switching element from the charge/discharge controller 123, and the power converter 122 does not convert the power when a low level signal is entered into the switching element from the charge/discharge controller 123.

The charge/discharge controller 123 acquires an order from the control apparatus 50 via the power monitor 124 and determines, based on the acquired order, whether to perform the voltage transformation by the voltage transformer 121 and the power conversion by the power converter 122. When the voltage transformation by the voltage transformer 121 and the power conversion by the power converter 122 are performed, the storage battery 11 is charged/discharged. On the other hand, when the voltage transformation and power conversion are not performed, the storage battery 11 is not charged/discharged.

The power monitor 124 measures the AC power flowing through the power line A10 using a current transformer (CT) C122 installed on the power line A10. Then, the power monitor 124 notifies the control apparatus 50 of the measurement results. Here, the power line A10 is a line for supplying AC power used for charging/discharging the storage battery 11 within the power conditioner 12. Moreover, the power monitor 124 receives orders from the control apparatus 50 and sends the orders to the charge/discharge controller 123.

The power generation apparatus 20 is an apparatus that generates power from, for example, sunlight and is installed on the roof of the home H1. The power generation apparatus 20 includes a solar panel 21 that is, for example, a polycrystalline silicon type, and a power conditioner 22 that converts the power generated by the solar panel 21.

The solar panel 21 generates DC power from sunlight and supplies the DC power to the power conditioner 22 via a power line D20. The power conditioner 22 converts the DC power supplied via the power line D20 to AC power and supplies the AC power to the electricity storage apparatus 10 via a power line A20. The power supplied to the electricity storage apparatus 10 via the power line A20 is appropriated for being stored in the storage battery 11, consumed by the load devices 61 and 62, and sold to the commercial power source PS. Here, the power line A20 is a line for supplying the power generated by the power generation apparatus 20 to the electricity storage apparatus 10.

The power monitoring apparatus 40 measures the power generated by the power generation apparatus 20 using a current transformer C20 installed on the power line A20 within the distribution board 30. Moreover, the power monitoring apparatus 40 measures the power consumed by the load devices 61 and 62 using current transformers C61 and C62 within the distribution board 30 that are installed on the power lines for supplying power to the load devices 61 and 62 from the electricity storage apparatus 10. In this embodiment, for easier understanding of the description, it is assumed that the power consumed by each of the load devices 61 and 62 is measured by their respective current transformers C61 and C62. Then, the power monitoring apparatus 40 notifies the control apparatus 50 of the measurement results.

The control apparatus 50 is a home energy management system (HEMS) controller capable of collectively controlling the devices in the home H1. The control apparatus 50 monitors the operation states of the load devices 61 and 62 by periodically acquiring from the load devices 61 and 62 their operation states. The control apparatus 50 includes a device controller 51 that controls the operation states of the load devices 61 and 62, a power monitor 52 that acquires measurement results from the power monitor 124 of the electricity storage apparatus 10 and the power monitoring apparatus 40, and a projector 53 that projects the transitions of the total power consumption of the load devices 61 and 62 and the power generation of the power generation apparatus 20. The total power consumption of the load devices 61 and 62 is referred to as the total power hereafter.

Figure 3:
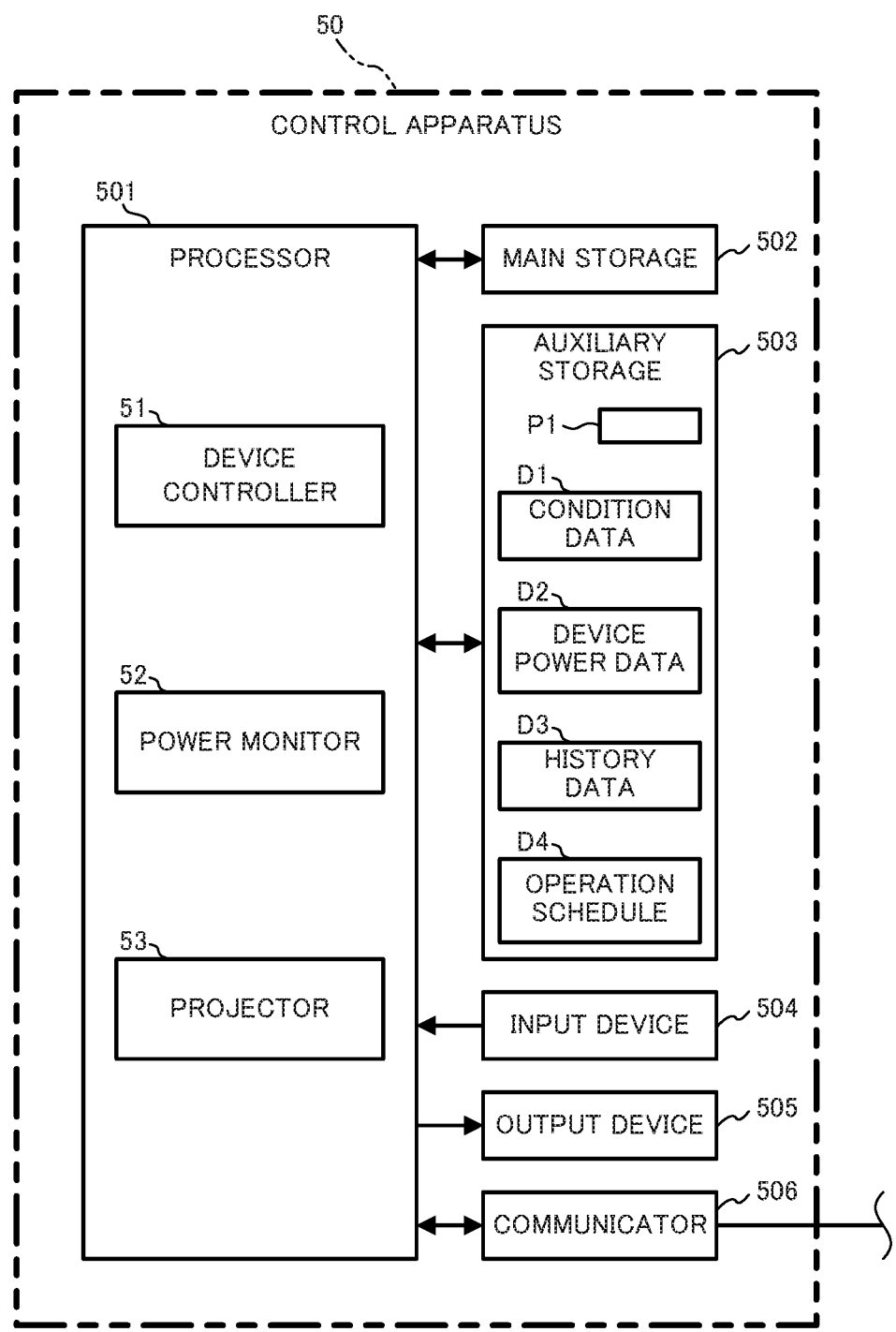
FIG. 3 is a block diagram illustrating the configuration of a control apparatus.

FIG. 3 illustrates a configuration of the control apparatus 50. As illustrated in FIG. 3, the control apparatus 50 is configured as a computer that includes a processor 501, a main storage 502, an auxiliary storage 503, an input device 504, an output device 505, and a communicator 506. The main storage 502, the auxiliary storage 503, the input device 504, the output device 505, and the communicator 506 are all connected to the processor 501 via communication lines.

The processor 501 includes a central processing unit (CPU) or the like. The processor 501 executes programs P1 stored in the auxiliary storage 503 to exert various functions. The processor 501 functionally includes a device controller 51, a power monitor 52, and a projector 53.

The main storage 502 includes a random access memory (RAM) or the like. The main storage 502 loads the programs P1 from the auxiliary storage 503. Then, the main storage 502 is used as the work area of the processor 501.

The auxiliary storage 503 includes a non-volatile memory such as a hard disk drive (HDD) or a flash memory. The auxiliary storage 503 stores, in addition to the programs P1, various types of data used in processing of the processor 501. The data stored in the auxiliary storage 503 includes condition data D1 indicating conditions for the electricity storage apparatus 10 to charge/discharge the storage battery 11, device power data D2 indicating the power consumed by each of the load devices 61 and 62, history data D3 indicating power records acquired by the power monitor 52, and an operation schedule D4 of each of the load devices 61 and 62.

The condition data D1 indicates a discharge condition for the electricity storage apparatus 10 to supply power through discharge of the storage battery 11. The discharge condition is defined based on the value of the total power of the load devices 61 and 62 and the value of the power generation of the power generation apparatus 20, and is satisfied when the value obtained by subtracting the value of the power generation from the value of the total power exceeds a threshold. For example, in a case where the value of the power generation is zero, the discharge condition is satisfied when the value of the total power exceeds a threshold of 1700 W. This threshold refers to the output value when input of approximately 2200 W is converted at an efficiency of approximately 78% (1700 W=2200 W×0.78) in FIG. 2.

Moreover, the condition data D1 indicates a charge condition for the electricity storage apparatus 10 to store power in the storage battery 11. The charge condition is defined based on the value of the total power of the load devices 61 and 62 and the value of the power generation of the power generation apparatus 20, and is satisfied when the value of surplus power obtained by subtracting the value of the total power from the value of the power generation exceeds a threshold. Here, the surplus power refers to the power generation from which the total power is deducted. For example, the charge condition is satisfied when the value of the power supplied to the electricity storage apparatus 10 exceeds a threshold of 1700 W. This threshold refers to the value of input power when the power is converted at an efficiency of 75% in FIG. 2.

The device power data D2 is data indicating the power consumed by each of the load devices 61 and 62 in association with the operation states of each of the load devices 61 and 62. FIG. 4 schematically illustrates an example of the device power data D2. Device ID in FIG. 4 is an identifier for identifying each of the load devices 61 and 62. As for the device IDs, in the example illustrated in FIG. 4, the IDs are equal to the reference numbers of the load devices 61 and 62. Moreover, in FIG. 4, power consumption "900-1000 W" associated with an operation state "water boiling" means that the power consumption fluctuates within a range from 900 W to 1000 W.

The history data D3 contains records of power that passed through the power line A10, power generated by the power generation apparatus 20, and power consumed by each of the load devices 61 and 62. The history data D3 is stored in the auxiliary storage 503 by the power monitor 52. Here, the record of power consumed by each of the load devices 61 and 62 is substantially equal to the record of total power.

Figure 5:
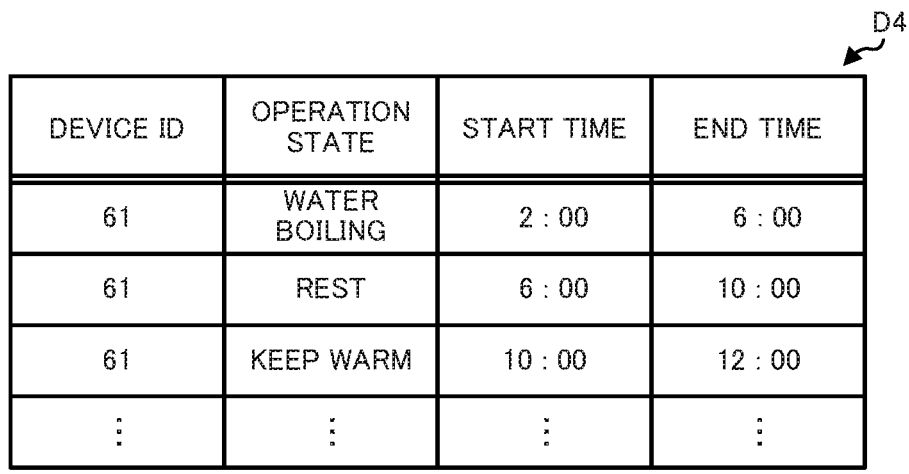
FIG. 5 is a chart illustrating an operation schedule.

The operation schedule D4 is, for example, data associating the operation states of the load devices 61 and 62 with the times of starting and ending the operations in the operation states as illustrated in FIG. 5.

The input device 504 includes, for example, input keys, a capacitance type pointing device, and the like. The input device 504 acquires information entered by the user of the control apparatus 50 and notifies the processor 501. The input device 504 is used, for example, to change data stored in the auxiliary storage 503.

The output device 505 includes, for example, a display device such as a liquid crystal display (LCD). For example, formed integrally with the pointing device constituting the input device 504, the output device 505 constitutes a touch screen.

The communicator 506 includes a communication interface circuit for communicating with the load devices 61 and 62, the power monitoring apparatus 40, and the electricity storage apparatus 10. The communicator 506 receives from the storage battery 11 a signal indicating the remaining level of the power stored in the storage battery 11 of the electricity storage apparatus 10 and notifies the processor 501 of the remaining level indicated by the signal. Moreover, the communicator 506 acquires measurement results from the power monitor 124 of the electricity storage apparatus 10 and the power monitoring apparatus 40 and notifies the processor 501. Moreover, the communicator 506 transfers control orders output from the processor 501 to the load devices 61 and 62. Furthermore, the communicator 506 acquires from the load devices 61 and 62 the operation states and notifies the processor 501 of the operation states of the load devices 61 and 62.

Referring back to FIG. 1, the load devices 61 and 62 are electrical devices installed in the home H1. The load device 61 according to this embodiment is a storage type electrical water heater. The load device 61 generally consumes power during the night when the electricity billing rate is low so as to perform the water boiling operation and store hot water. Moreover, the load device 61 performs the keep-warm operation as appropriate during the day and supplies hot water to the user for having a bath and the like. Moreover, the load device 62 according to this embodiment is an air-conditioning device. The load device 62 performs cooling operation or heating operation so that the room temperatures in the home H1 reach temperatures set by the user.

The control procedure executed by the control apparatus 50 is described hereafter with reference to FIGS. 6 to 17. The control procedure illustrated in FIG. 6 starts when the control apparatus 50 is powered on.

First, the processor 501 of the control apparatus 50 determines whether the current total power of the load devices 61 and 62 is greater than the current power generation of the power generation apparatus 20 (Step S1). Specifically, the power monitor 52 of the control apparatus 50 determines whether the total power consumed by the load devices 61 and 62 is greater than the power generated by the power generation apparatus 20.

If the processor 501 determines that the total power is greater than the power generation (Step S1; Yes), the processor 501 executes the discharge procedure (Step S2). The discharge procedure is described in detail using FIGS. 7 to 9.

Figure 7:
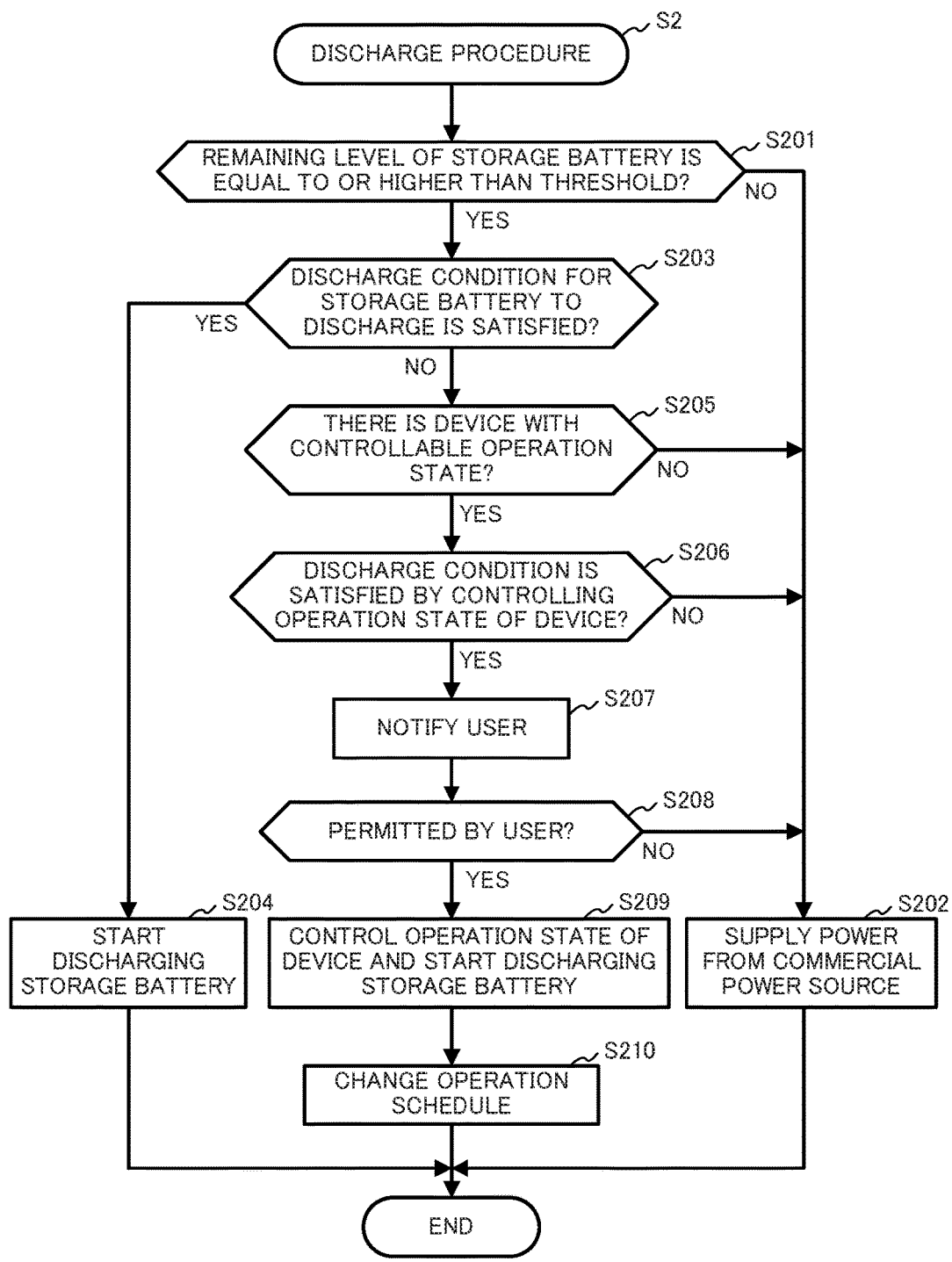
FIG. 7 is a flowchart illustrating a discharge procedure.

As illustrated in FIG. 7, in the discharge procedure, the processor 501 first determines whether the remaining level of the storage battery 11 is equal to or higher than a threshold (Step S201). For example, the power monitor 52 acquires a signal indicating the remaining level of the storage battery 11 and determines whether the remaining level indicated by the signal is equal to or higher than 20% of the capacity of the storage battery 11.

If the processor 501 determines that the remaining level falls below the threshold (Step S201; No), the processor 501 orders the electricity storage apparatus 10 to supply power from the commercial power source PS to the load devices 61 and 62 (Step S202). As a result, the load devices 61 and 62 are supplied with power from the commercial power source PS and power generation apparatus 20 without the storage battery 11 discharging. Subsequently, the processor 501 ends the discharge procedure.

On the other hand, if the processor 501 determines that the remaining level is equal to or higher than the threshold (Step S201; Yes), the processor 501 determines whether the discharge condition for the storage battery 11 to discharge is satisfied based on the condition data D1 and the value of the total power (Step S203). Specifically, the power monitor 52 determines whether the value obtained by subtracting the power generation of the power generation apparatus 20 from the total power of the load devices 61 and 62 exceeds a threshold of 1700 W.

If the processor 501 determines that the discharge condition is satisfied (Step S203; Yes), the processor 501 orders the electricity storage apparatus 10 to start discharging the storage battery 11 (Step S204). As a result, the power discharged from the storage battery 11 is supplied to the load devices 61 and 62 from the electricity storage apparatus 10. Subsequently, the processor 501 ends the discharge procedure.

On the other hand, if the processor 501 determines that the discharge condition is not satisfied (Step S203; No), the processor 501 determines whether there is a device with a controllable operation state (Step S205). Specifically, the device controller 51 determines based on the operation schedule D4 whether there is a device that is both scheduled to operate in the future and currently operable. For example, the water boiling operation of the load device 61 does not need to be performed at a fixed time and there is no problem if the scheduled operation time is changed to some other time at night. Therefore, the processor 501 can determine that the load device 61 is a controllable device.

Figure 8:
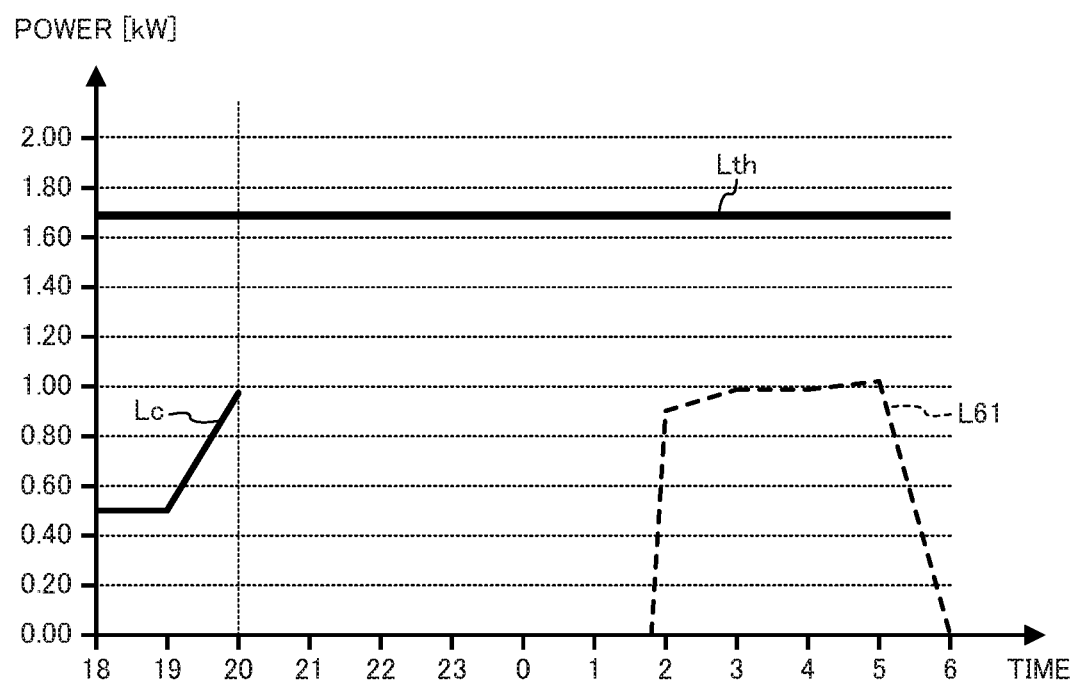
FIG. 8 is a chart for describing the discharge procedure.

FIG. 8 illustrates that the value of the total power of the load devices 61 and 62 does not exceed the threshold at a time of 20:00 and the water boiling operation of the load device 61 is scheduled later. A line Lc in FIG. 8 represents the transition of the total power of the load devices 61 and 62. Moreover, a line Lth represents the threshold (1700 W) of the discharge condition and charge condition. Moreover, a line L61 represents the transition of the power consumed in the water boiling operation of the load device 61. The processor 501 calculates the transition of the power represented by the line L61 based on the device power data D2 and operation schedule D4. The processor 501 calculates the transition of the power using the average, upper limit, or lower limit of the power consumption when a power consumption range is defined for the device in the device power data D2. Here, because it is at night, the power generation is zero and not illustrated in FIG. 8.

If the processor 501 determines that there is no controllable device (Step S205; No), the processor 501 shifts the processing to Step S202. On the other hand, if the processor 501 determines that there is a controllable device (Step S205; Yes), the processor 501 determines whether the discharge condition is satisfied by controlling the operation state of the device (Step S206). Specifically, the device controller 51 determines based on the device power data D2 whether the total power of the load devices 61 and 62 is increased and exceeds the threshold of 1700 W by causing the operable device to start operating.

Figure 9:
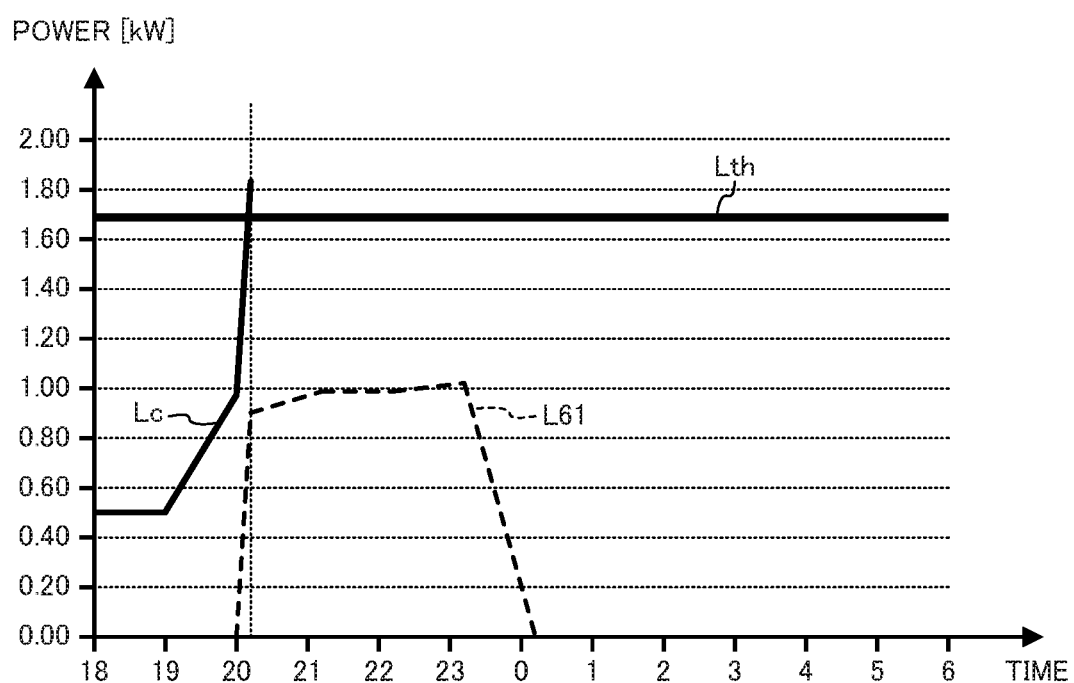
FIG. 9 is another chart for describing the discharge procedure.

FIG. 9 illustrates that the load device 61 starts the water boiling operation at the time of 20:00. As seen from FIG. 9, as the load device 61 starts the water boiling operation, the value of the total power of the load devices 61 and 62 exceeds the threshold.

If the processor 501 determines that the discharge condition is not satisfied even by controlling the operation state of the device (Step S206; No), the processor 501 shifts the processing to Step S202. On the other hand, if the processor 501 determines that the discharge condition is satisfied by controlling the operation state of the device (Step S206; Yes), the processor 501 notifies the user that the operation state of the device is to be controlled (Step S207). Specifically, the processor 501 displays on the output device 505 that the device will start operating so as to satisfy the discharge condition. Moreover, the processor 501 asks the user for permission to control the operation state of the device for satisfying the discharge condition.

Then, the processor 501 determines whether the control of the operation state of the device is permitted by the user (Step S208). If the processor 501 determines that the control of the operation state of the device is not permitted (Step S208; No), the processor 501 shifts the processing to Step S202.

On the other hand, if the processor 501 determines that the control of the operation state of the device is permitted (Step S208; Yes), the processor 501 controls the operation state of the device to satisfy the discharge condition and starts discharging the storage battery 11 (Step S209). For example, the device controller 51 causes the load device 61 to start the water boiling operation. As a result, as illustrated in FIG. 9, the discharge condition is satisfied. Moreover, the processor 501 orders the electricity storage apparatus 10 to discharge the storage battery 11. As a result, the power in the storage battery 11 that is converted at a high conversion efficiency is supplied to the load devices 61 and 62.

Then, the processor 501 changes the operation schedule D4 (Step S210). For example, the processor 501 changes the contents of the operation schedule D4 so that the water boiling operation of the load device 61 starts at the current time, not at the initially scheduled time (see FIG. 8).

Subsequently, the processor 501 ends the discharge procedure.

Referring back to FIG. 6, if it is determined in the Step S1 that the total power is equal to or lower than the power generation (Step S1; No), the processor 501 executes the charge procedure (Step S3). The charge procedure is described in detail using FIGS. 10 to 12.

Figure 10:
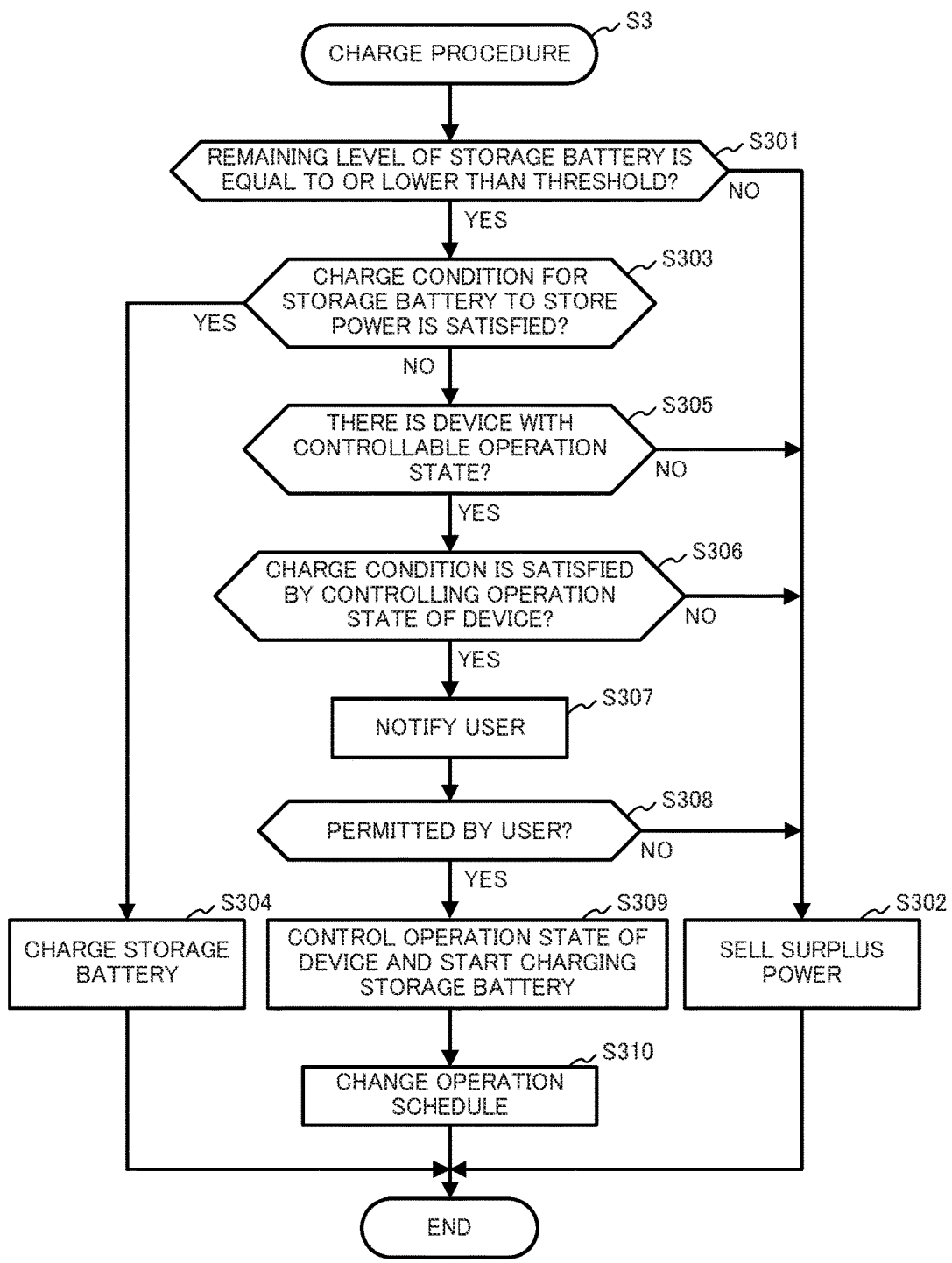
FIG. 10 is a flowchart illustrating a charge procedure.

As illustrated in FIG. 10, in the charge procedure, the processor 501 first determines whether the remaining level of the storage battery 11 is equal to or lower than a threshold (Step S301). This threshold is, for example, 95% of the capacity of the storage battery 11.

If the processor 501 determined that the remaining level exceeds the threshold (Step S301; No), the processor 501 reversely flows surplus power to the commercial power source PS for selling (Step S302). Subsequently, the processor 501 ends the charge procedure.

On the other hand, if the processor 501 determined that the remaining level is equal to or lower than the threshold (Step S301; Yes), the processor 501 determines based on the condition data D1 and the value of the surplus power whether the charge condition for the storage battery 11 to store power is satisfied (Step S303). Specifically, the power monitor 52 determines whether the value of the surplus power obtained by subtracting the total power of the load devices 61 and 62 from the power generation of the power generation apparatus 20 exceeds a threshold of 1700 W.

If the processor 501 determined that the charge condition is satisfied (Step S303; Yes), the processor 501 orders the electricity storage apparatus 10 to start charging the storage battery 11 (Step S304). As a result, the power supplied from the power generation apparatus 20 to the electricity storage apparatus 10 is stored in the storage battery 11. Subsequently, the processor 501 ends the charge procedure.

On the other hand, if the processor 501 determined that the charge condition is not satisfied (Step S303; No), the processor 501 determines whether there is a device with a controllable operation state (Step S305). Specifically, the device controller 51 determines based on the operation schedule D4 whether there is a device that is both currently in operation and stoppable. For example, the keep-warm operation of the load device 61 does not need to be performed at a fixed time and there is no problem if the scheduled operation time is changed to some other time. Therefore, the processor 501 can determine that the load device 61 is a controllable device.

Figure 11:
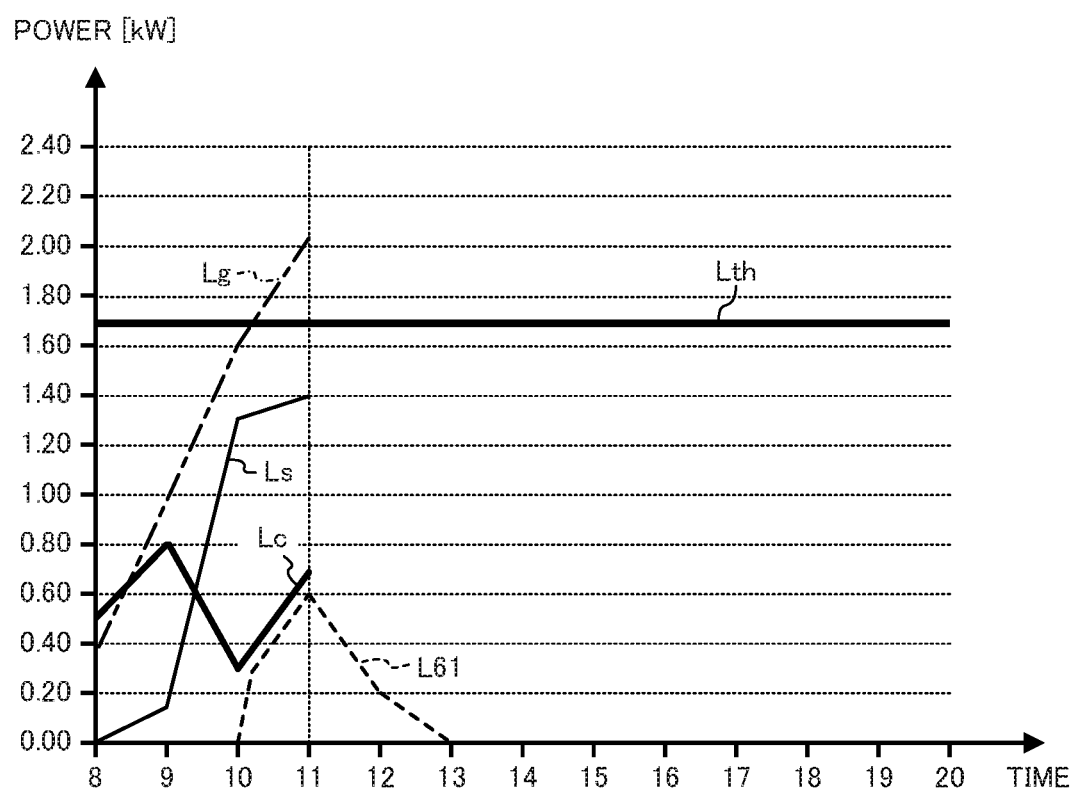
FIG. 11 is a chart for describing the charge procedure.

FIG. 11 illustrates that the value of the surplus power does not exceed the threshold and that the load device 61 is performing the keep-warm operation at a time of 11:00. A line Lc in FIG. 11 represents the transition of the total power of the load devices 61 and 62. Moreover, a line Lg represents the transition of the power generation of the power generation apparatus 20. A line Ls represents the transition of the surplus power. A line L61 represents the transition of the power consumed in the keep-warm operation of the load device 61.

If the processor 501 determined that there is no controllable device (Step S305; No), the processor 501 shifts the processing to Step S302. On the other hand, if the processor 501 determined that there is a controllable device (Step S305; Yes), the processor 501 determines whether the charge condition is satisfied by controlling the operation state of the device (Step S306). Specifically, the device controller 51 determines based on the device power data D2 whether the surplus power is increased and exceeds the threshold of 1700 W by stopping the operation of the stoppable device.

Figure 12:
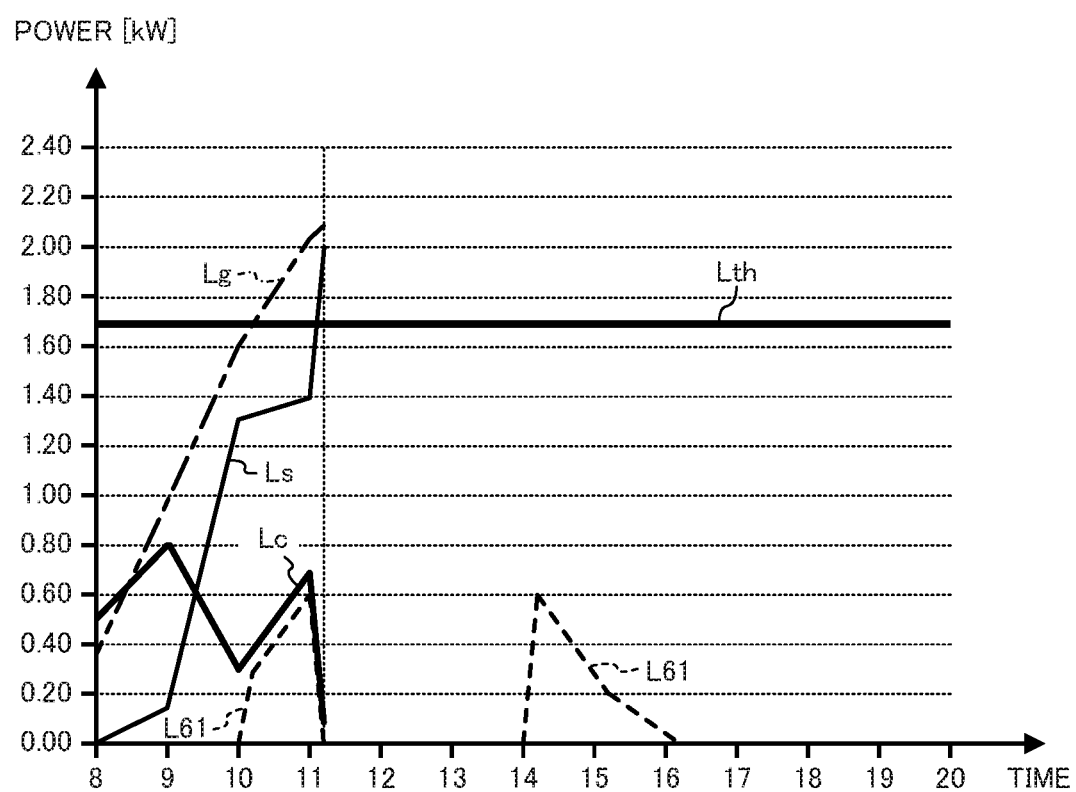
FIG. 12 is another chart for describing the charge procedure.

FIG. 12 illustrates that the load device 61 stops the keep-warm operation from the time of 11:00. As seen from FIG. 12, as the load device 61 stops the keep-warm operation, the value of the surplus power represented by the line Ls exceeds the threshold.

If the processor 501 determined that the charge condition is not satisfied by controlling the operation state of the device (Step S306; No), the processor 501 shifts the processing to Step S302. On the other hand, if the processor 501 determined that the charge condition is satisfied by controlling the operation state of the device (Step S306; Yes), the processor 501 notifies the user that the operation state of the device is to be controlled (Step S307). Specifically, the processor 501 displays on the output device 505 that the device is to be stopped so as to satisfy the charge condition. Moreover, the processor 501 asks the user for permission to control the operation state of the device to satisfy the charge condition.

Then, the processor 501 determines whether the control of the operation state of the device is permitted by the user (Step S308). If the processor 501 determined that the control of the operation state of the device is not permitted (Step S308; No), the processor 501 shifts the processing to Step S302.

On the other hand, if the processor 501 determined that the control of the operation state of the device is permitted (Step S308; Yes), the processor 501 controls the operation state of the device to satisfy the charge condition and starts charging the storage battery 11 (Step S309). For example, the device controller 51 stops the keep-warm operation of the load device 61. As a result, as illustrated in FIG. 12, the charge condition is satisfied. Moreover, the processor 501 orders the electricity storage apparatus 10 to charge the storage battery 11. As a result, the generated power converted at a high conversion efficiency is stored in the storage battery 11.

Then, the processor 501 changes the operation schedule D4 (Step S310). For example, the processor 501 changes the contents of the operation schedule D4 so that the keep-warm operation of the load device 61, which is initially scheduled to continue as represented by the line L61 in FIG. 11, stops once and then resumes as illustrated in FIG. 12.

Subsequently, the processor 501 ends the charge procedure.

Referring back to FIG. 6, after the discharge procedure (Step S2) or charge procedure (Step S3) ends, the processor 501 determines whether the current time is a preset time (Step S4). For example, the processor 501 determines whether the current time is 23:00.

If the processor 501 determined that the current time is not the preset time (Step S4; No), the processor 501 shifts the processing to Step S9. On the other hand, if the processor 501 determined that the current time is the preset time (step S4; Yes), the processor 501 projects the next day's transitions of the total power of the load devices 61 and 62 and the power generation of the power generation apparatus 20 (Step S5). Specifically, the projector 53 projects average transitions of the total power and power generation from the history data D3 accumulated over the past one week.

Figure 13:
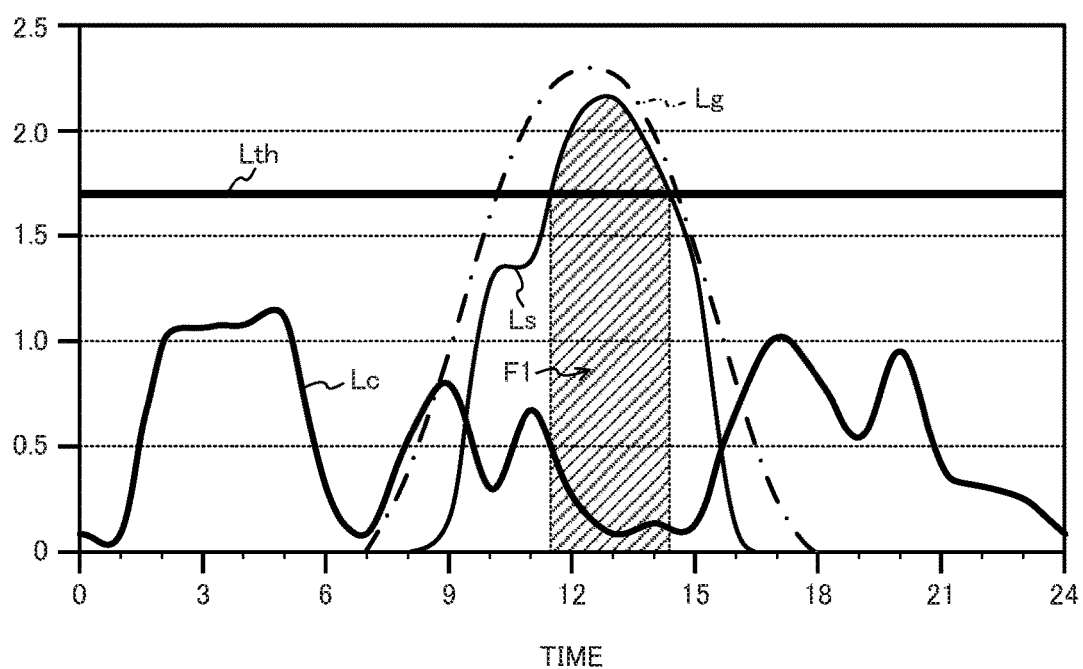
FIG. 13 is a chart illustrating transitions of total power and power generation projected by a projector.

FIG. 13 illustrates the transitions of the total power and power generation projected by the processor 501. In FIG. 13, a line Lc represents the transition of the total power and a line Lg represents the transition of the power generation. Moreover, a line Ls represents the transition of the surplus power after deducting the total power from the power generation. A hatched field F1 represents the electrical energy of surplus power supplied to the electricity storage apparatus 10 and used for charging the storage battery 11.

Then, the processor 501 divides the time over which the power transition is projected and selects one time slot (Step S6). For example, the processor 501 divides 24 hours of the next day into one-hour time slots and selects any one of 24 time slots.

Then, the processor 501 executes the schedule change procedure on the selected time slot (Step S7). The schedule change procedure is described specifically using FIGS. 14 to 17.

Figure 14:
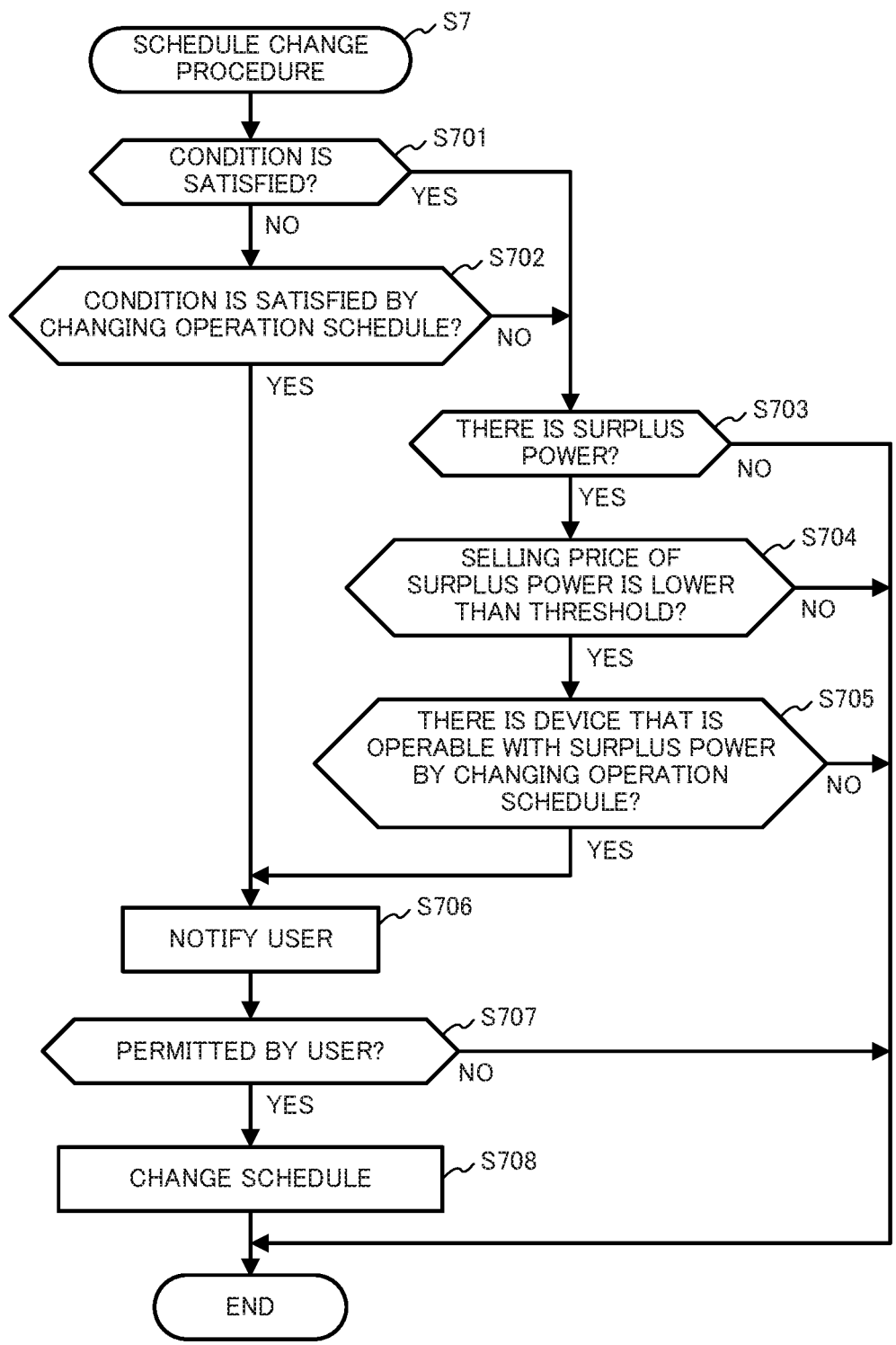
FIG. 14 is a flowchart illustrating a schedule change procedure.

As illustrated in FIG. 14, in the schedule change procedure, the processor 501 first determines whether a condition for charging/discharging the storage battery 11 is satisfied in the selected time slot (Step S701). Specifically, the device controller 51 determines based on the condition data D1 and the projected values of the total power and power generation whether the discharge condition or charge condition is satisfied.

If the processor 501 determined that no condition is satisfied (Step S701; No), the processor 501 determines whether a condition is satisfied by changing the operation schedule D4 (Step S702). Specifically, the device controller 51 determines based on the device power data D2 whether the discharge condition or charge condition is satisfied by changing the operation schedule D4 of the load devices 61 and 62.

Figure 15:
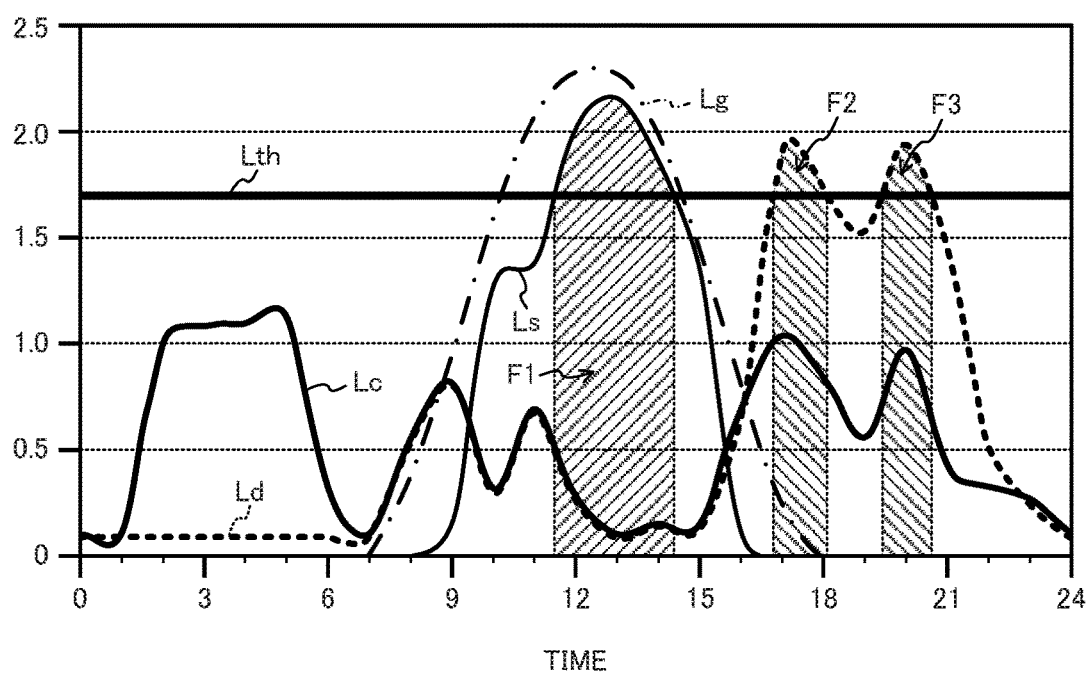
FIG. 15 is a chart for describing changing of the operation schedule so as to satisfy a discharge condition.

For example, when a time slot between 17:00 and 18:00 is selected, as illustrated in FIG. 13, neither the discharge condition nor the charge condition is satisfied in this time slot. However, as illustrated in FIG. 15, it is understood that if the operation schedule D4 for the water boiling operation of the load device 61, which is scheduled to be from 2:00 to 6:00, is changed to from 17:00 to 22:00, the value of the total power represented by a line Ld exceeds the threshold in a time slot between 17:00 and 18:00. As a result, the discharge condition is satisfied from 17:00 to 18:00, which thereby enables power stored in the storage battery 11 to be supplied to the load devices 61 and 62 at a high conversion efficiency.

Here, the line Ld in FIG. 15 represents the transition of the total power when the operation schedule D4 is changed and hatched fields F2 and F3 represent the electrical energy supplied from the electricity storage apparatus 10 through discharge of the storage battery 11.

Figure 16:
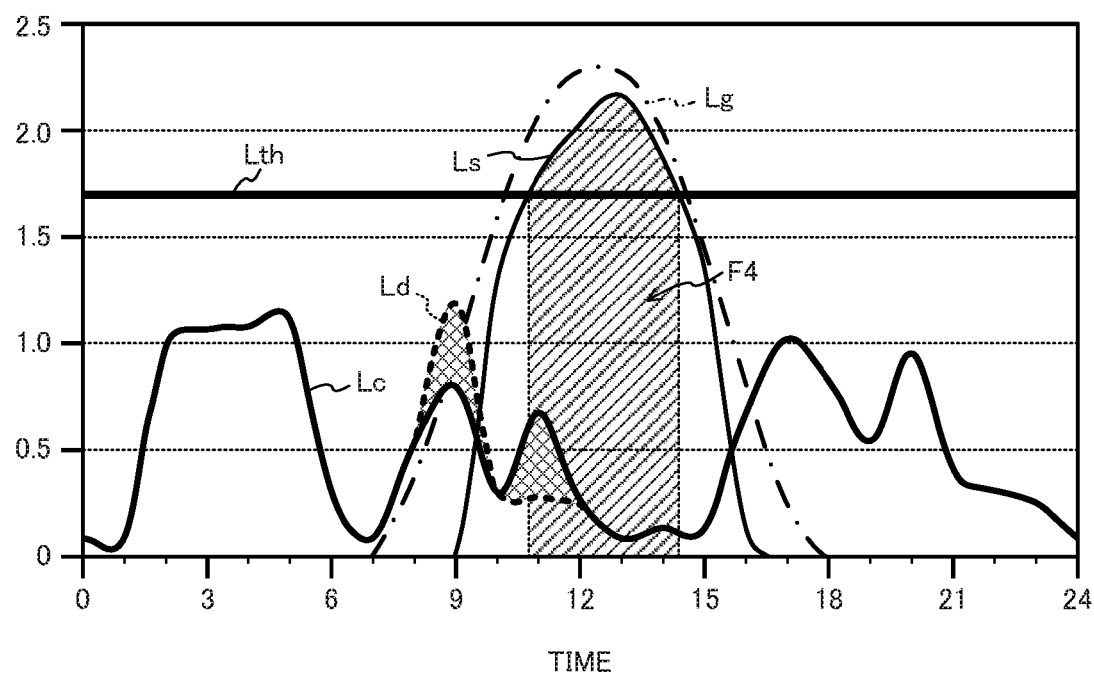
FIG. 16 is a chart for describing the changing of the operation schedule so as to satisfy a charge condition.

Moreover, when a time slot between 10:00 and 11:00 is selected, as illustrated in FIG. 13, neither the discharge condition nor the charge condition is satisfied in this time slot. However, as illustrated in FIG. 16, it is understood that if the start time of the keep-warm operation of the load device 61, which is scheduled to be performed around 11:00, is changed to around 9:00, the value of the surplus power represented by a line Ls exceeds the threshold in a time slot between 11:00 and 12:00. As a result, the charge condition is satisfied from 11:00 to 12:00, which thereby enables power supplied to the electricity storage apparatus 10 to be converted at a high conversion efficiency and enables use of the power for charging the storage battery 11.

Here, a hatched field F4 in FIG. 16 represents the electrical energy of surplus power supplied to the electricity storage apparatus 10 and used for charging the storage battery 11.

Figure 17:
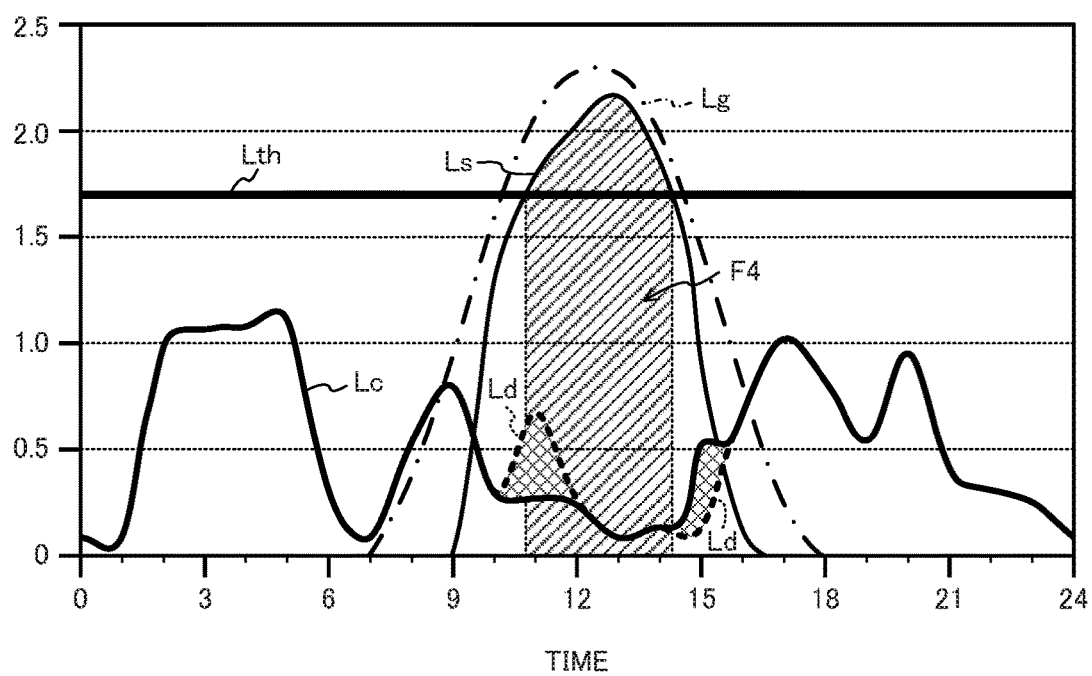
FIG. 17 is another chart for describing the changing of the operation schedule so as to satisfy the charge condition.

Moreover, when the operation schedule D4 is changed as illustrated in FIG. 16, the total power exceeds the power generation from 8:00 to 9:00 and it is necessary to purchase power from the commercial power source PS. Thus, as illustrated in FIG. 17, the operation schedule D4 may be changed so that the keep-warm operation of the load device 61, which is scheduled to be performed around 11:00, is performed around 15:00. Even if the keep-warm operation is performed around 15:00, the total power of the load devices 61 and 62 does not exceeds the power generation around 15:00 and therefore, the keep-warm operation can be performed with the generated power without purchasing power from the commercial power source PS.

Referring back to FIG. 14, if it is determined in the Step S701 that a condition is satisfied (Step S701; Yes) or if it is determined in the Step S702 that no condition is satisfied even with change in the operation schedule D4 (Step S702; No), the processor 501 determines whether there is some surplus power in the selected time slot (Step S703). In other words, the processor 501 determines whether the value of the surplus power is a positive value greater than zero. Here, if it is determined in the Step S702 that no condition is satisfied even with change in the operation schedule D4 (Step S702; No), it means that there is no such change in the operation schedule that results in satisfying the discharge condition or charge condition.

If the processor 501 determined that there is no surplus power (Step S703; No), the processor 501 ends the schedule change procedure. On the other hand, if the processor 501 determines that there is some surplus power (Step S703; Yes), the processor 501 determines whether the selling price of the surplus power is lower than a threshold (Step S704).

If the selling price is equal to or higher than the threshold (Step S704; No), the processor 501 ends the schedule change procedure. As a result, the surplus power can be sold at a relatively high price.

On the other hand, if the processor 501 determined that the selling price is lower than the threshold (Step S704; Yes), the processor 501 determines whether there is a device that is operable with the surplus power by changing the operation schedule D4 (Step S705). In other words, the processor 501 determines based on the device power data D2 whether the surplus power is reduced by changing the operation schedule D4 of either one of the load devices 61 and 62. If the determination is negative in the Step S705 (Step S705; No), the processor 501 ends the schedule change procedure.

If it is determined in the Step S702 that a condition is satisfied by changing the operation schedule D4 (Step S702; Yes) or if the determination is positive in the Step S705 (Step S705; Yes), the processor 501 notifies the user that the operation schedule D4 is to be changed (Step S706). Specifically, the processor 501 displays on the output device 505 that the operation schedule D4 of a device is changed for satisfying a condition or reducing the surplus power. Moreover, the processor 501 asks the user for permission to change the operation schedule D4.

Then, the processor 501 determines whether the change of the operation schedule D4 is permitted by the user (Step S707). If the processor 501 determined that the change of the operation schedule D4 is not permitted (Step S707; No), the processor 501 ends the schedule change procedure.

On the other hand, if the processor 501 determined that the change of the operation schedule D4 is permitted (Step S707; Yes), the processor 501 changes the operation schedule D4 to satisfy a condition or reduce the surplus power (Step S708). Specifically, the device controller 51 changes the contents of the operation schedule D4 stored in the auxiliary storage 503. As a result, the operation schedule D4 is changed so as to realize, for example, the transition of the total power represented by the line Ld in FIGS. 15 to 17.

Subsequently, the processor 501 ends the schedule change procedure.

Referring back to FIG. 6, after the schedule change procedure (Step S7) ends, the processor 501 determines whether all time slots are selected (Step S8). If the processor 501 determined that not all time slots are selected (Step S8; No), the processor 501 returns to the Step S6 and selects an unselected time slot. Then, the processor 501 repeats the processing of the Step S6 and subsequent steps.

On the other hand, if the processor 501 determined that all time slots are selected (Step S8; Yes), the processor 501 controls the load devices 61 and 62 according to the operation schedule D4 (Step S9). Subsequently, the processor 501 repeats the processing of the Step S1 and subsequent steps.

As described above, the control apparatus 50 according to this embodiment controls the operation states of the load devices 61 and 62 so as to satisfy the condition for charging/discharging the storage battery 11. The total power of the load devices 61 and 62 is made suitable for charging/discharging of the electricity storage apparatus 10. As a result, the electricity storage apparatus 10 can be utilized by increasing the chance of charging/discharging the storage battery 11 without lowering the power conversion efficiency. Hence, the operation efficiency of the electricity storage apparatus can be improved.

Moreover, the control apparatus 50 controls the operation states of the load devices 61 and 62 by changing the operation schedule D4 of the load devices 61 and 62. As a result, the operation states of the load devices 61 and 62 can be prevented from unnecessarily changing to an initially unscheduled operation state.

Moreover, the control apparatus 50 changes the operation schedule D4 of the load devices 61 and 62 so as to satisfy the condition for charging/discharging the storage battery 11. As a result, the operations of the load devices 61 and 62 can be planned so as to utilize the electricity storage apparatus 10.

Moreover, even if no condition is satisfied, the control apparatus 50 changes the operation schedule D4 of the load devices 61 and 62 so that the load devices 61 and 62 operate with the surplus power. As a result, the surplus power can effectively be used.

Moreover, the control apparatus 50 notifies the user that the operation states are to be controlled in controlling the operation states of the load device 61 and 62. As a result, the user of the control apparatus 50 can acknowledge in advance that the operation states of the load devices 61 and 62 will change.

Moreover, the control apparatus 50 controls the operation states of the load devices 61 and 62 when the user gives permission to control the operation states. As a result, the operation states of the load devices 61 and 62 can be prevented from changing to an operation state the user does not intend.

Moreover, the control apparatus 50 projects the transitions of the total power and power generation based on the history data D3. As a result, for example, when there are hours in which the home H1 is in the shadow of a large building, the control apparatus 50 can project decrease in the power generation and increase in the total power due to use of lighting apparatuses with accuracy.

Embodiment 2

Embodiment 2 is described hereafter with a focus on the differences from the above-described Embodiment 1. Here, the same or equivalent components as those in Embodiment 1 are referred to by equivalent reference numbers and their descriptions are omitted or simplified.

The control system 100 according to this embodiment is different from that of Embodiment 1 in that the DC power generated from sunlight is used for charging the storage battery 11 without being converted to AC power.

Figure 18:
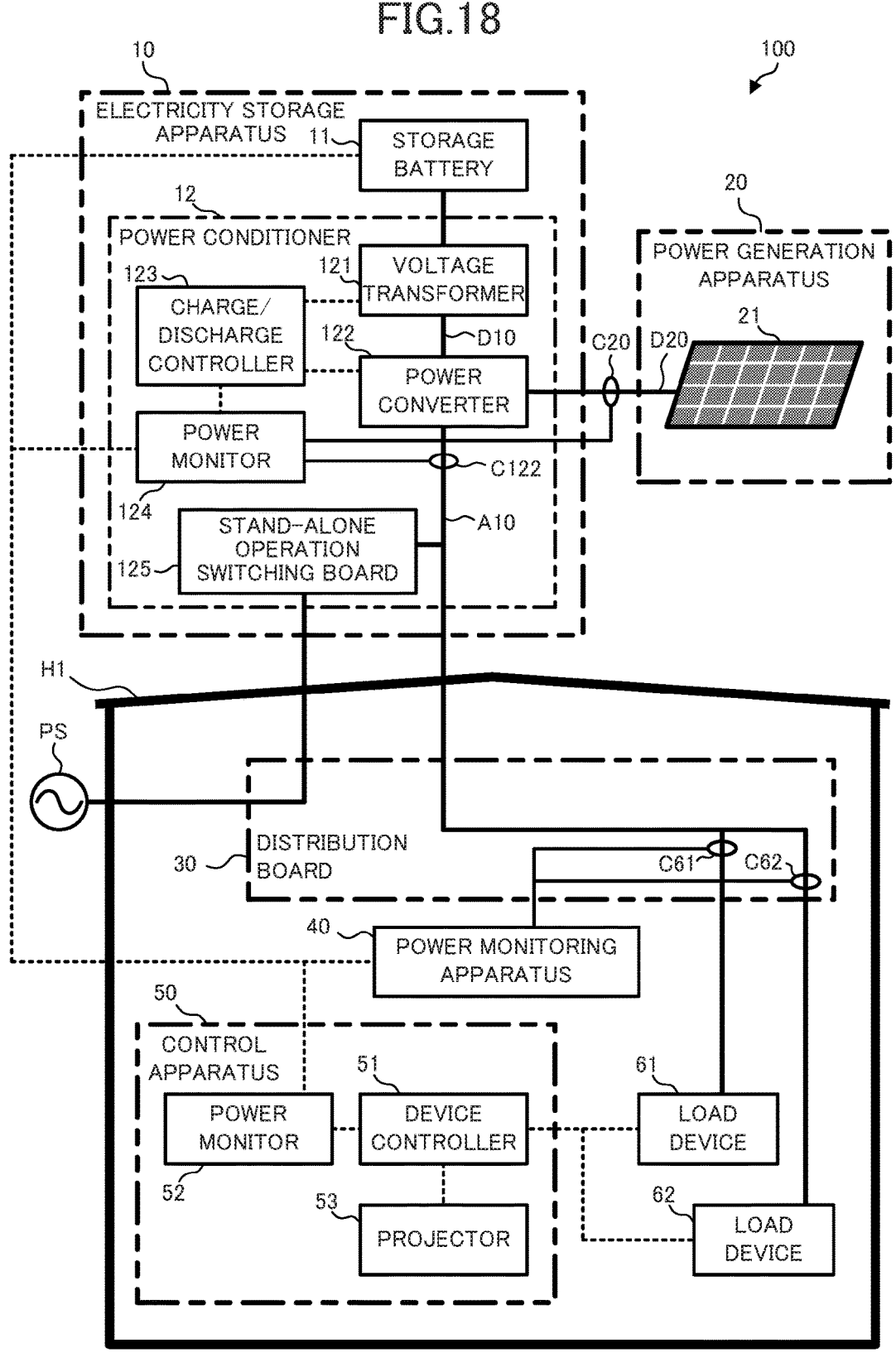
FIG. 18 is a diagram illustrating a configuration of the control system according to Embodiment 2.

FIG. 18 illustrates the configuration of the control system 100 according to this embodiment. As illustrated in FIG. 18, the power generation apparatus 20 is configured without the power conditioner for converting the power. The solar panel 21 of the power generation apparatus 20 supplies DC power generated from sunlight to the power converter 122 of the electricity storage apparatus 10 via the power line D20. The generated power supplied to the power converter 122 from the solar panel 21 is used for any of charging of the storage battery 11, supply to the load devices 61 and 62, and reverse power flow to the commercial power source PS.

When the generated power is used for charging the storage battery 11, the power converter 122 supplies the DC power supplied from the power generation apparatus 20 to the voltage transformer 121 via the power line D10 as it is. Moreover, when the generated power is used for supply to the load devices 61 and 62 or for reverse power flow to the commercial power source PS, the power converter 122 converts the DC power supplied from the power generation apparatus 20 to AC power.

Moreover, in this embodiment, the power generated by the power generation apparatus 20 is measured by the power monitor 124 using the current transformer C20. The power monitor 124 notifies the control apparatus 50 of the measured value of the generated power.

Figure 19:
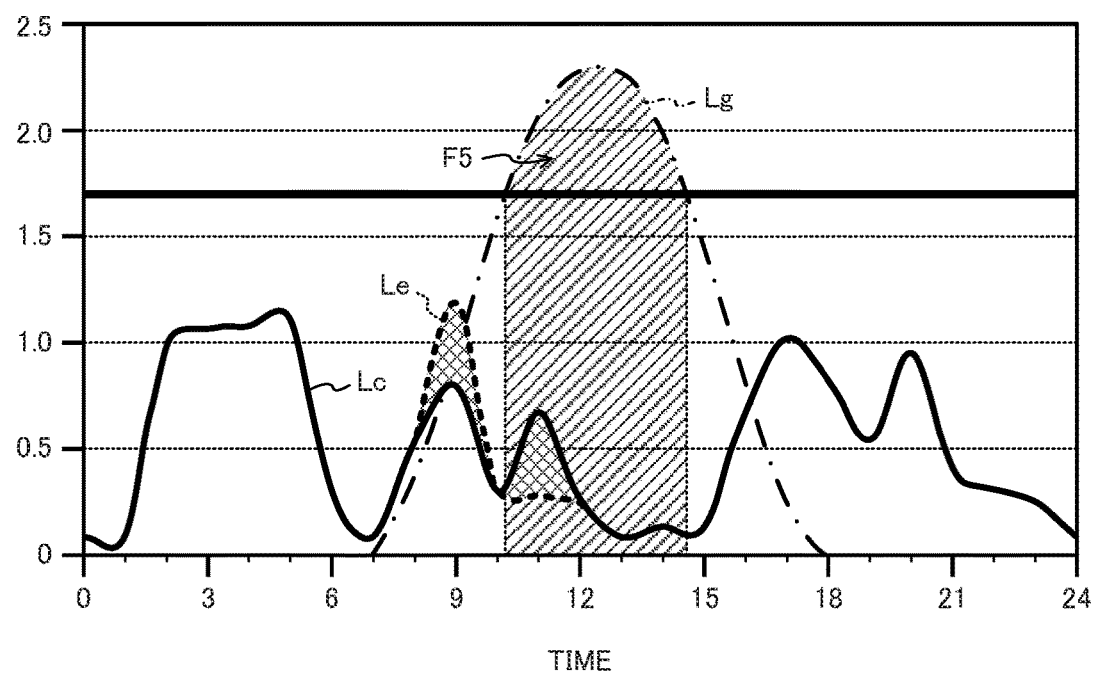
FIG. 19 is a chart for describing changing of the operation schedule in the schedule change procedure.

FIG. 19 illustrates the transition of the total power of the load devices 61 and 62 and transition of the power generation of the power generation apparatus 20 that are projected by the projector 53 of the control apparatus 50. In FIG. 19, a line Le represents the transition of the total power when the consumption of the surplus power is increased by changing the operation schedule D4 although the condition for charging the storage battery 11 is not satisfied. This change in the operation schedule D4 corresponds to what is discussed in the determination of the Step S705 in FIG. 14. Moreover, a hatched field F5 in FIG. 19 represents the electrical energy supplied to the electricity storage apparatus 10 and used for charging the storage battery 11.

As described above, in this embodiment, the DC power generated by the solar panel 21 is stored in the storage battery 11 without being converted to AC power. As a result, occurrence of power conversion loss in charging the storage battery 11 can be prevented.

Embodiment 3

Embodiment 3 is described hereafter with a focus on the differences from the above-described Embodiment 1. Here, the same or equivalent components as those in Embodiment 1 are referred to by equivalent reference numbers and their descriptions are omitted or simplified.

Figure 20:
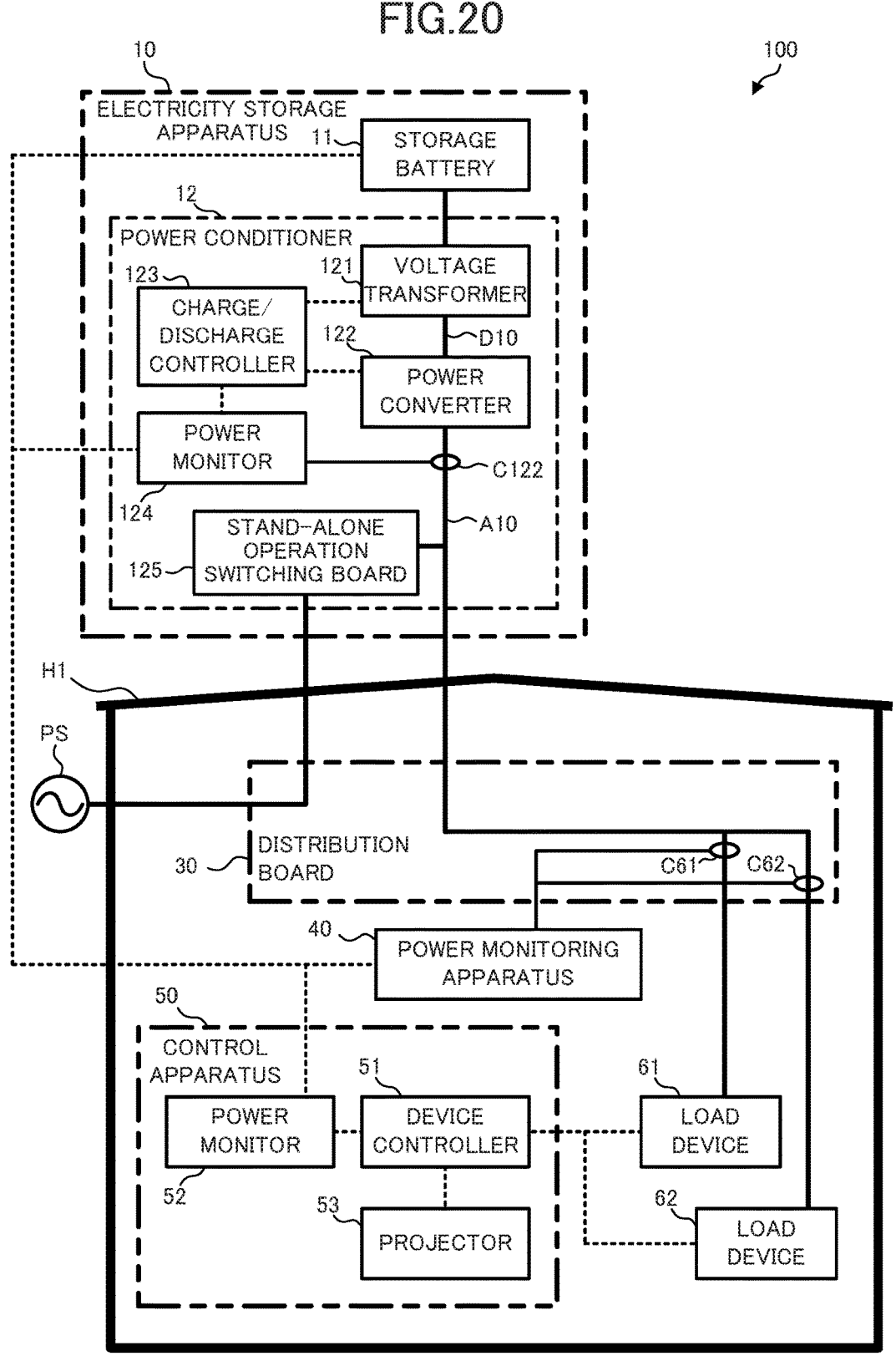
FIG. 20 is a diagram illustrating a configuration of the control system according to Embodiment 3.

The control system 100 according to this embodiment is different from that of Embodiment 1 in that the power generation apparatus 20 is excluded as illustrated in FIG. 20. Here, the storage battery 11 stores power supplied from the commercial power source PS during, for example, the night when the electricity billing rate is low.

The discharge condition according to this embodiment is that the value of the power supplied to the load devices 61 and 62 from the electricity storage apparatus 10 exceeds a threshold of 800 W. This threshold means the output value when input of approximately 1200 W is converted at an efficiency of approximately 67% in FIG. 2 (800 W=1200 W×0.67).

Figure 21:
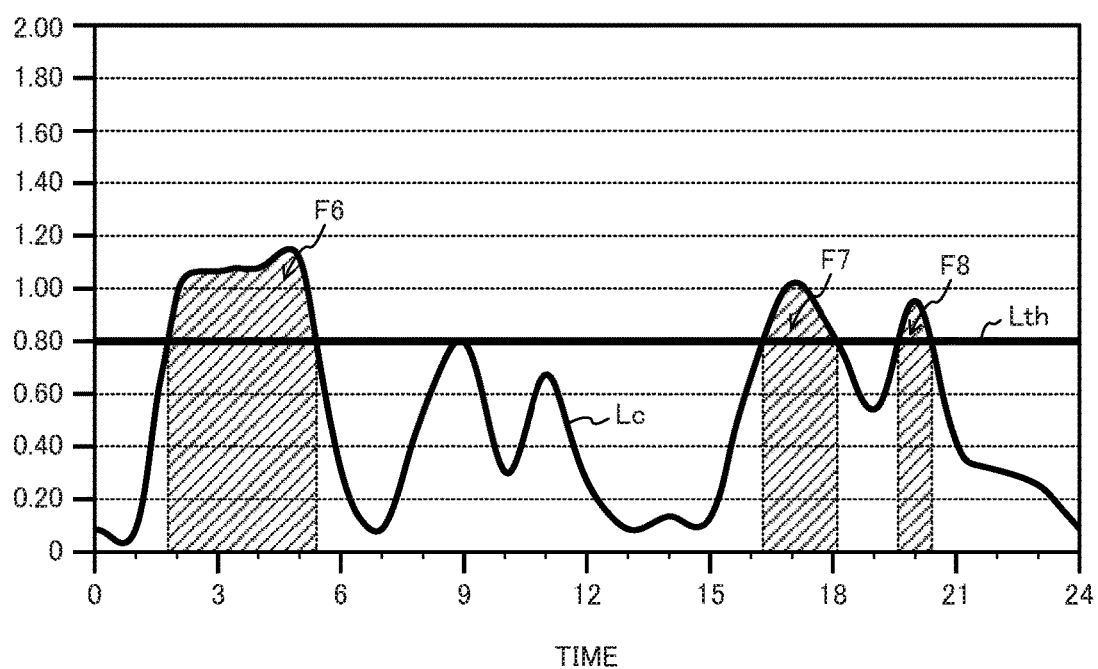
FIG. 21 is a chart illustrating the transition of the total power projected by the projector.

FIG. 21 illustrates the transition of the total power of the load devices 61 and 62 projected by the projector 53 of the control apparatus 50. Hatched fields F6, F7, and F8 in FIG. 21 represent the electrical energy supplied to the load devices 61 and 62 from the electricity storage apparatus 10 through discharge of the storage battery 11. As seen from FIG. 21, the discharge condition is not satisfied from 8:00 to 11:00.

Figure 6:
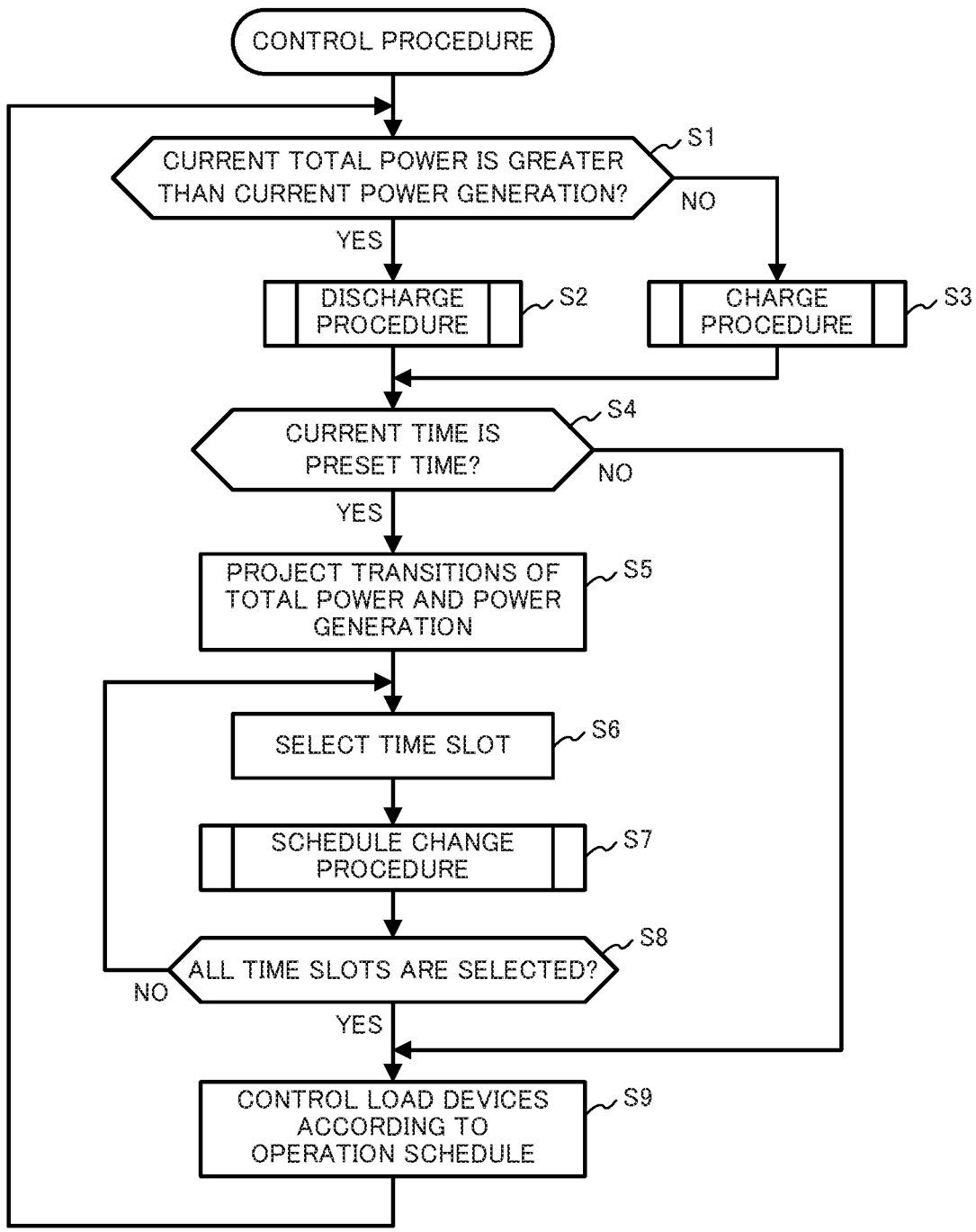
FIG. 6 is a flowchart illustrating a control procedure.

The control apparatus 50 according to this embodiment executes procedures equivalent to the control procedure illustrated in FIG. 6, the discharge procedure illustrated in FIG. 7, and the schedule change procedure illustrated in FIG. 14. However, these procedures are equal to the procedures in which the power generation is invariably zero. Moreover, the control apparatus 50 does not execute the charge procedure illustrated in FIG. 10.

Figure 22:
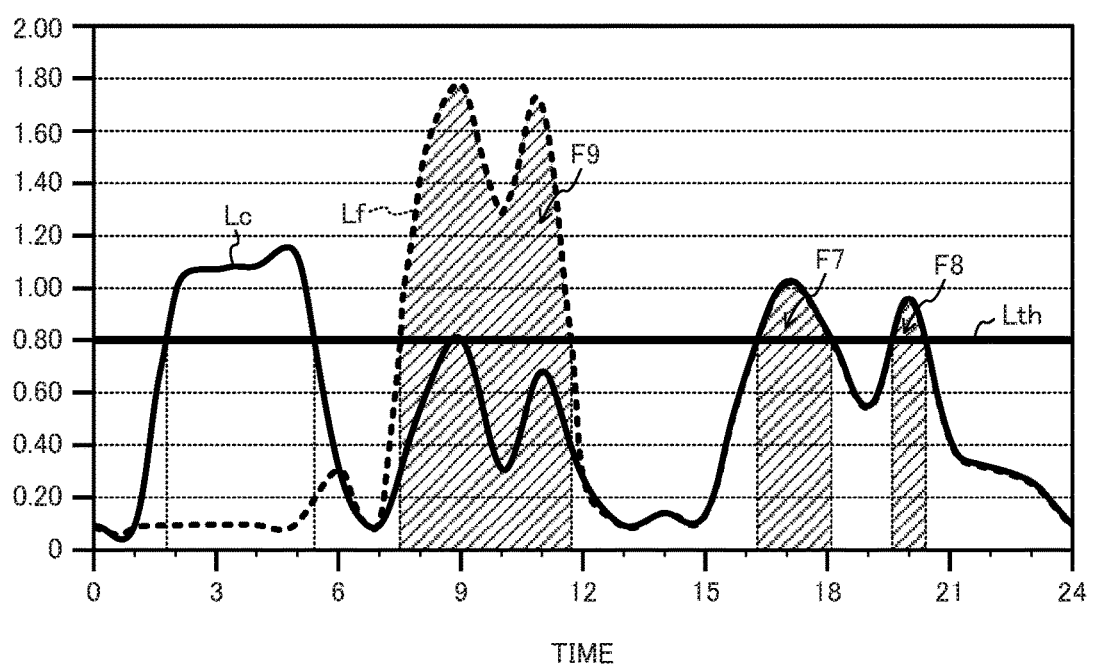
FIG. 22 is a chart for describing changing of the operation schedule so as to satisfy the discharge condition.

In FIG. 22, a line Lf represents the transition of the total power when the operation schedule D4 of the load device 61 is changed so as to satisfy the discharge condition from 8:00 to 11:00. A hatched field F9 represents the electrical energy supplied to the load devices 61 and 62 from the electricity storage apparatus 10 through discharge of the storage battery 11 when the operation schedule D4 is changed.

As described above, the control system 100 according to this embodiment is configured without the power generation apparatus 20. Even when the control system 100 does not have the power generation apparatus 20, the control system 100 can utilize the electricity storage apparatus 10 by increasing the chance of discharging the storage battery 11 without lowering the power conversion efficiency.

Moreover, as illustrated in FIG. 22, the discharge condition can be satisfied from 8:00 to 11:00 by changing the operation schedule D4 of the load device 61. Furthermore, the electrical energy represented by the field F9 in FIG. 22 is larger than the electrical energy represented by the field F6 in FIG. 21. In other words, by changing the operation schedule D4 a larger electrical energy can be supplied at a higher conversion efficiency to the load devices 61 and 62 from the electricity storage apparatus 10.

Here, change in the operation schedule D4 is not limited to simple shift of the operation start time and end time of the load devices 61 and 62. For example, the scheduled length of operation time may be increased or an initially scheduled single operation may be divided into multiple operations.

Figure 23:
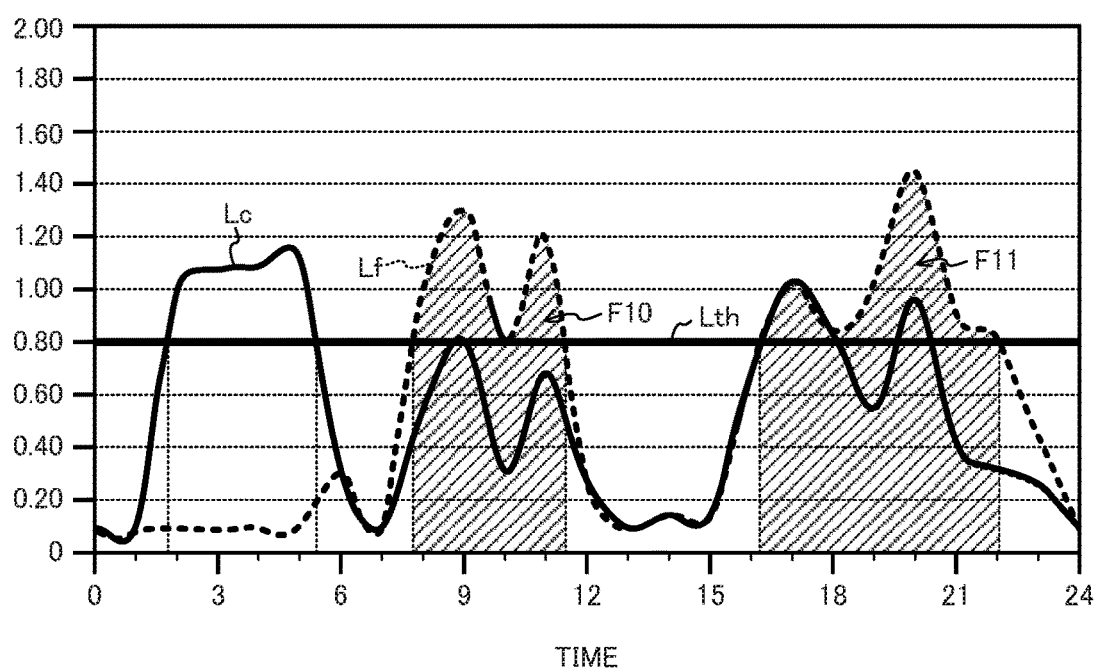
FIG. 23 is another chart for describing the changing of the operation schedule so as to satisfy the discharge condition.

FIG. 23 illustrates the transition of power consumption when the water boiling operation of the load device 61 scheduled from 1:00 to 6:00 is divided into two operations, one from 8:00 to 12:00 and the other from 18:00 to 22:00. In FIG. 23, hatched fields F10 and F11 represent the electric energy supplied to the electrical devices 61 and 62 from the electricity storage apparatus 10 through discharge of the storage battery 11 when the operation schedule D4 is changed. As illustrated in FIG. 23, by changing the operation schedule D4, power can be supplied to the load devices 61 and 62 from the electricity storage apparatus 10 over an extended length of time while satisfying the discharge condition.

Embodiment 4

Embodiment 4 is described hereafter with a focus on the differences from the above-described Embodiment 1. Here, the same or equivalent components as those in Embodiment 1 are referred to by equivalent reference numbers and their descriptions are omitted or simplified.

The thresholds for defining the charge condition and discharge condition according to this embodiment are different from that of Embodiment 1 in that the thresholds vary according to the time.

Figure 24:
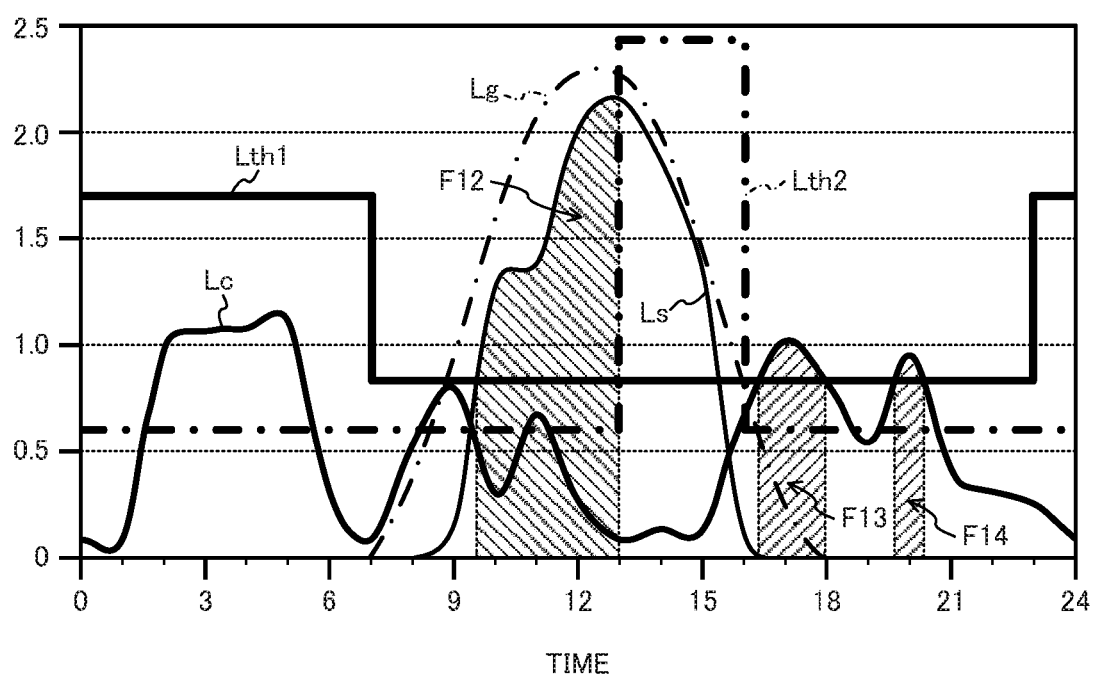
FIG. 24 is a chart for describing a threshold according to Embodiment 4.

FIG. 24 illustrates the transition of the total power of the load devices 61 and 62 and transition of the power generation of the power generation apparatus 20 that are projected by the projector 53 of the control apparatus 50. In FIG. 24, a line Lth1 represents the threshold for defining the discharge condition and a line Lth2 represents the threshold for defining the charge condition. Moreover, a hatched field F12 represents electrical energy of surplus power supplied to the electricity storage apparatus 10 and used for charging the storage battery 11, and fields F13 and F14 represent electrical energy supplied to the load devices 61 and 62 from the electricity storage apparatus 10 through discharge of the storage battery 11.

As described above, the threshold for defining the discharge condition according to this embodiment changes depending on the time. For example, if a low threshold is set for daylight hours in which the electricity billing rate of the commercial power source PS is high, the power stored in the electricity storage apparatus 10 is likely to be supplied to the load devices 61 and 62. The low threshold can be set to, for example, the output value when the power conversion efficiency is 50%. Moreover, if a high threshold is set for the night during which the electricity billing rate is relatively low, power is purchased more often from the commercial power source PS without using the power stored in the electricity storage apparatus 10. The high threshold can be set to, for example, the output value when the power conversion efficiency is 80%. As a result, the cost on the electricity bill can be suppressed.

Moreover, the threshold for defining the charge condition according to this embodiment changes depending on the time. For example, if a high threshold is set for 13:00 to 16:00 during which the power demand is high, the surplus power is likely to be reversely flowed to the commercial power source PS without being stored in the electricity storage apparatus 10. The high threshold can be set to, for example, the input value when the power conversion efficiency is 90%. Moreover, if a low threshold is set for hours in which the power demand is relatively low, the surplus power is more often stored in the electricity storage apparatus 10. The low threshold can be set to, for example, the input value when the power conversion efficiency is 30%. As a result, this can contribute to alleviating the power demand.

Embodiment 5

Embodiment 5 is described hereafter with a focus on the differences from the above-described Embodiment 1. Here, the same or equivalent components as those in Embodiment 1 are referred to by equivalent reference numbers and their descriptions are omitted or simplified.

Figure 25:
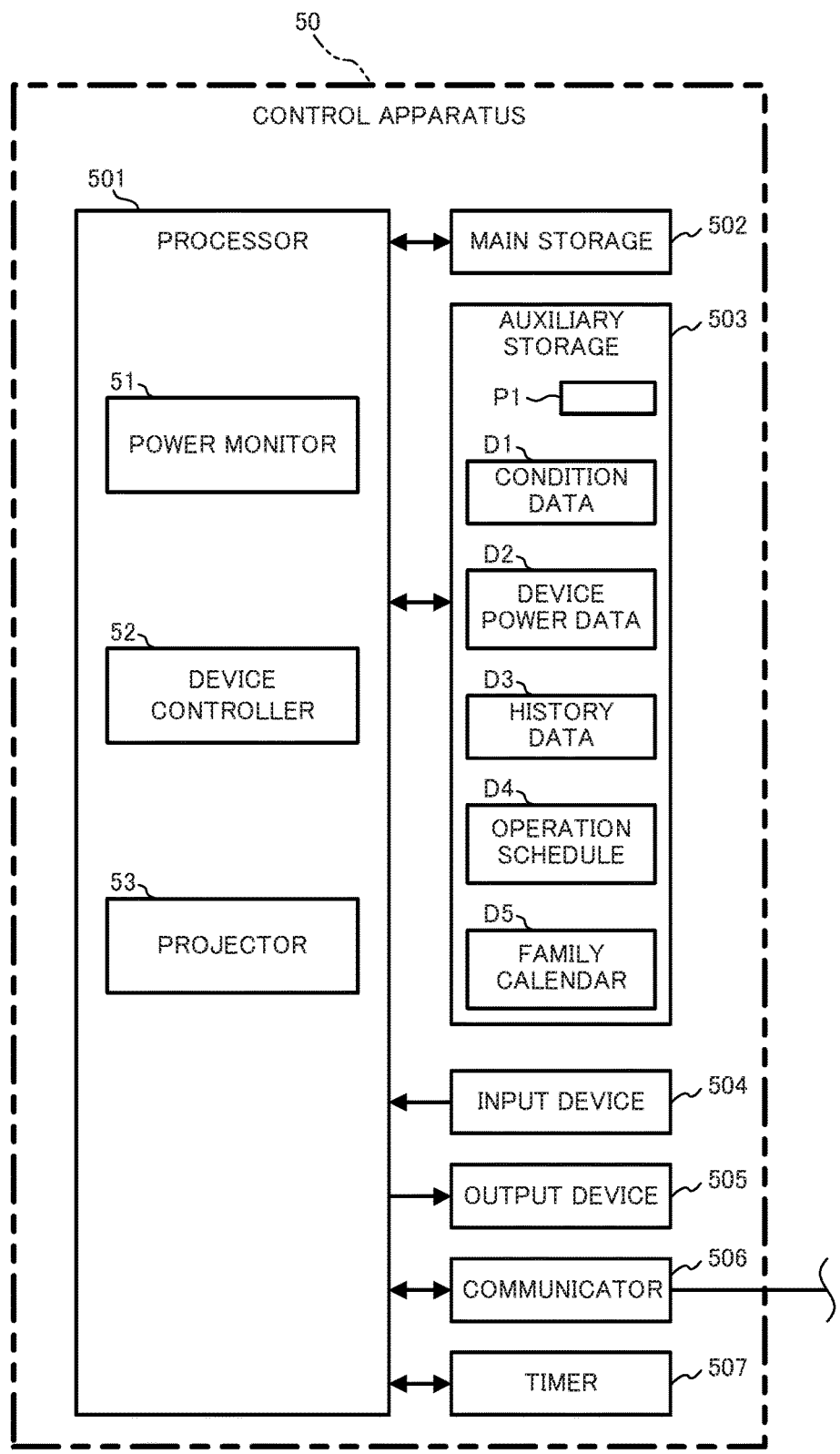
FIG. 25 is a block diagram illustrating a configuration of the control apparatus according to Embodiment 5.

FIG. 25 illustrates the configuration of the control apparatus 50 according to this embodiment. The auxiliary storage 503 of the control apparatus 50 stores a family calendar D5. The family calendar D5 is data representing the schedule of each of the users constituting a family living in the home H1. The user schedule includes, for example, scheduled outings.

The family calendar D5 is referred to when the projector 53 of the control apparatus 50 projects the transition of the total power of the load devices 61 and 62. For example, the projector 53 projects the total power of the load devices 61 and 62 to be low at times when all family members are scheduled to go out.

Moreover, the family calendar D5 is referred to when the operation schedule D4 is changed. For example, when the charge condition is not satisfied and there is some surplus power immediately before the time the family is scheduled to come home, the control apparatus 50 causes the load device 62 to start the cooling operation or heating operation.

Moreover, the control apparatus 50 includes a timer 507. The timer 507 includes, for example, a crystal oscillator or the like. The timer 507 measures the time according to an order from the processor 501 and notifies the processor 501 of the measurement result.

Figure 26:
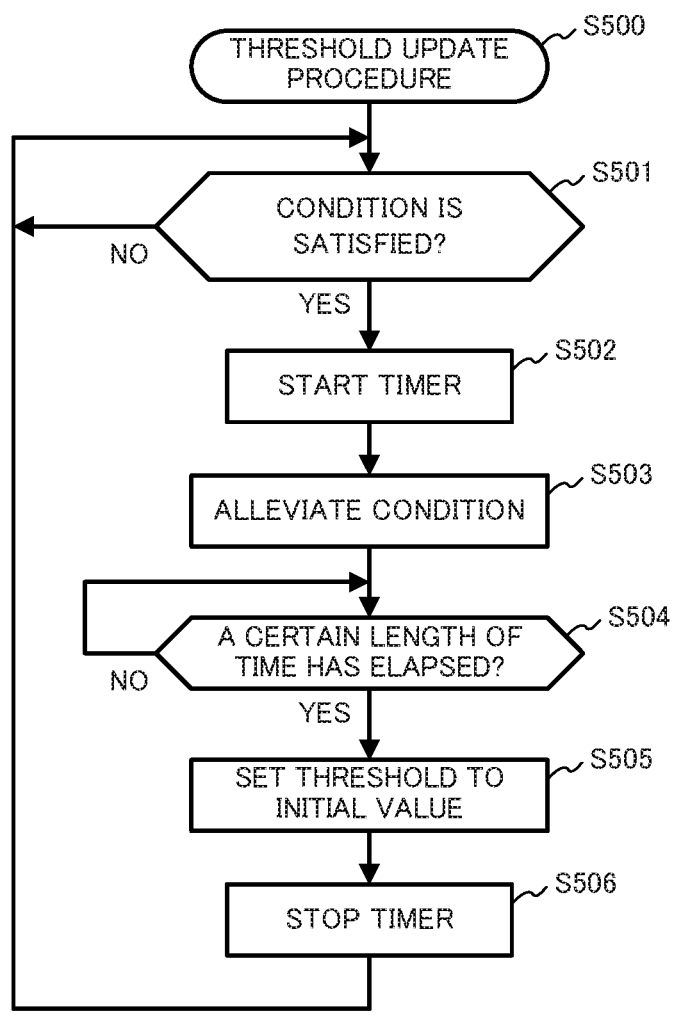
FIG. 26 is a flowchart illustrating a threshold update procedure.

The threshold update procedure executed by the processor 501 of the control apparatus 50 is described hereafter using the FIG. 26. The threshold update procedure starts as the control apparatus 50 is powered on. Moreover, the threshold update procedure is executed in parallel to the control procedure illustrated in FIG. 6.

In the threshold update procedure, the processor 501 first determines whether the condition for charging/discharging the storage battery 11 is satisfied (Step S501). If the processor 501 determines that the condition is not satisfied (Step S501; No), the processor 501 repeats the determination of the Step S501.

On the other hand, if the processor 501 determines that the condition is satisfied (Step S501; Yes), the processor 501 starts the timer 507 (Step S502). In other words, the processor 501 causes the timer 507 to start measuring the time. Then, the processor 501 alleviates the condition (Step S503). For example, the processor 501 decreases the threshold for defining the condition.

Then, the processor 501 determines whether a certain length of time has elapsed since the timer 507 starts measuring the time (Step S504). The certain length of time is, for example, five minutes. If the processor 501 determines that the certain length of time has not elapsed (Step S504; No), the processor 501 repeats the determination of the Step S504. On the other hand, if the processor 501 determines that the certain length of time has elapsed (Step S504; Yes), the processor 501 sets the threshold to an initial value (Step S505). The initial value is, for example, a value equal to the threshold according to Embodiment 1.

Then, the processor 501 stops the timer 507 (Step S506). Subsequently, the processor 501 repeats the processing of the Step S501 and subsequent steps.

Figure 27:
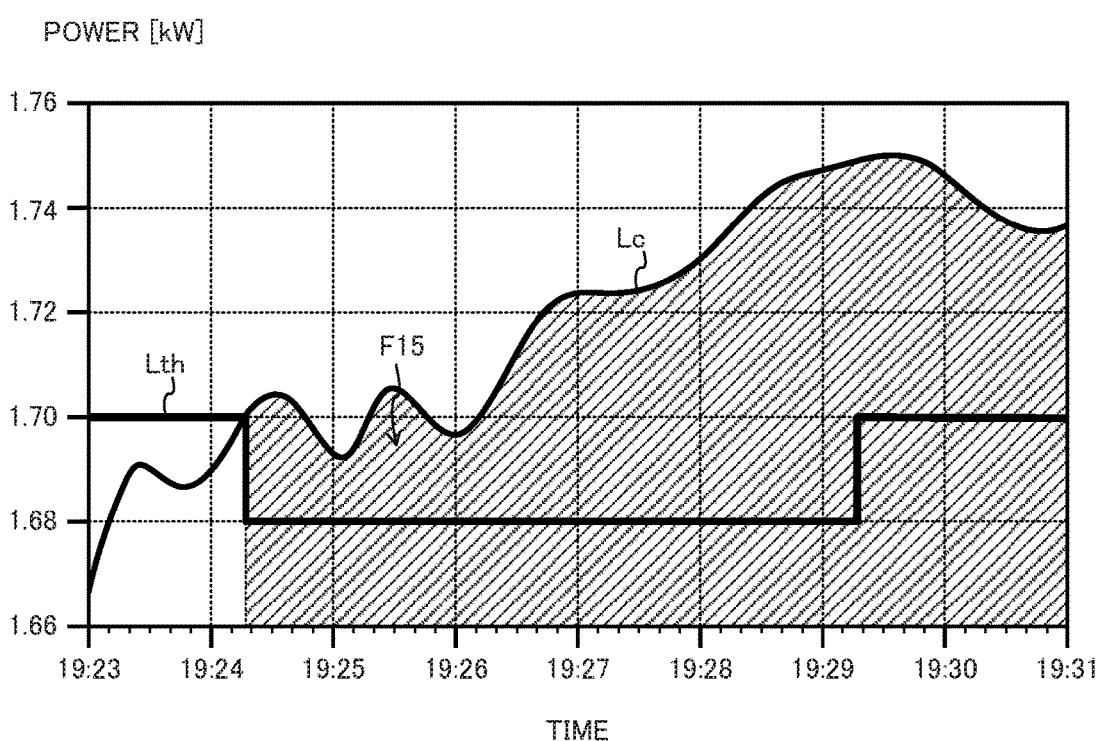
FIG. 27 is a chart illustrating the threshold updated in the threshold update procedure.

In FIG. 27, a line Lth represents an exemplary threshold updated in the threshold update procedure. A field F15 in FIG. 27 represents the electrical energy supplied to the load devices 61 and 62 from the electricity storage apparatus 10 through discharge of the storage battery 11. As illustrated in FIG. 27, the storage battery 11 continues to discharge at least for a certain length of time by changing the threshold to a lower value even when the total power of the load devices 61 and 62 fluctuates near the initial value (1.7 kW).

As described above, the control apparatus 50 according to this embodiment projects the transition of the total power of the load devices 61 and 62 based on the family calendar D5. As a result, the control apparatus 50 can make projections complying with the schedule of each of multiple users of the control apparatus 50.

Moreover, the control apparatus 50 changes the operation schedule D4 based on the family calendar D5. As a result, the control apparatus 50 can change the operation schedule D4 with consideration for the schedule of each of multiple users of the control apparatus 50 in changing the operation schedule D4 so as to satisfy the condition for charging/discharging the storage battery 11.

Moreover, in this embodiment, the condition is alleviated only for a certain length of time when the condition for charging/discharging the storage battery 11 is satisfied. In other words, hysteresis is introduced in the condition. As a result, this can prevent alternately repeated charge/discharge and rest in a short time due to fluctuation in the total power of the load devices 61 and 62 and power generation of the power generation apparatus 20. Hence, deterioration of the storage battery 11 due to switching between charge/discharge and rest can be suppressed.

Here, the condition may be tightened only for a certain length of time when the condition for charging/discharging becomes unsatisfied.

Moreover, hysteresis may be introduced in the condition without using the timer. For example, in addition to the above-described discharge condition (discharge start condition), a discharge continuation condition for determining whether to continue the discharge may be provided as the condition data D1. The discharge continuation condition is a condition more lax than the discharge condition and for example, a condition satisfied when the value obtained by subtracting the value of the power generation from the value of the total power exceeds 1600 W (<1700 W).

When the above discharge continuation condition is provided, the control apparatus 50 repeatedly determines whether the discharge continuation condition is satisfied while the electricity storage apparatus 10 discharges. Then, the control apparatus 50 allows the electricity storage apparatus 10 to continue to discharge when the discharge continuation condition is satisfied, and causes the electricity storage apparatus 10 to stop discharging when the discharge continuation condition is not satisfied.

As a result, starting discharging, the electricity storage apparatus 10 continues to discharge even if the power conversion efficiency becomes more or less low. Hence, deterioration of the storage battery 11 due to switching between charge/discharge and rest in a short time can be suppressed.

Here, in addition to the above-described charge condition (charge start condition), a charge continuation condition for determining whether to continue to charge may be provided as the condition data D1. The charge continuation condition is a condition more lax than the charge condition and for example, a condition satisfied when the value of the surplus power exceeds 1600 W (<1700 W).

Embodiment 6

Embodiment 6 is described hereafter with a focus on the differences from the above-described Embodiment 1. Here, the same or equivalent components as those in Embodiment 1 are referred to by equivalent reference numbers and their descriptions are omitted or simplified.

The thresholds for defining the charge condition and discharge condition according to this embodiment are different from that of Embodiment 1 in that the thresholds vary according to the remaining level of the power stored in the storage battery 11.

Figure 28:
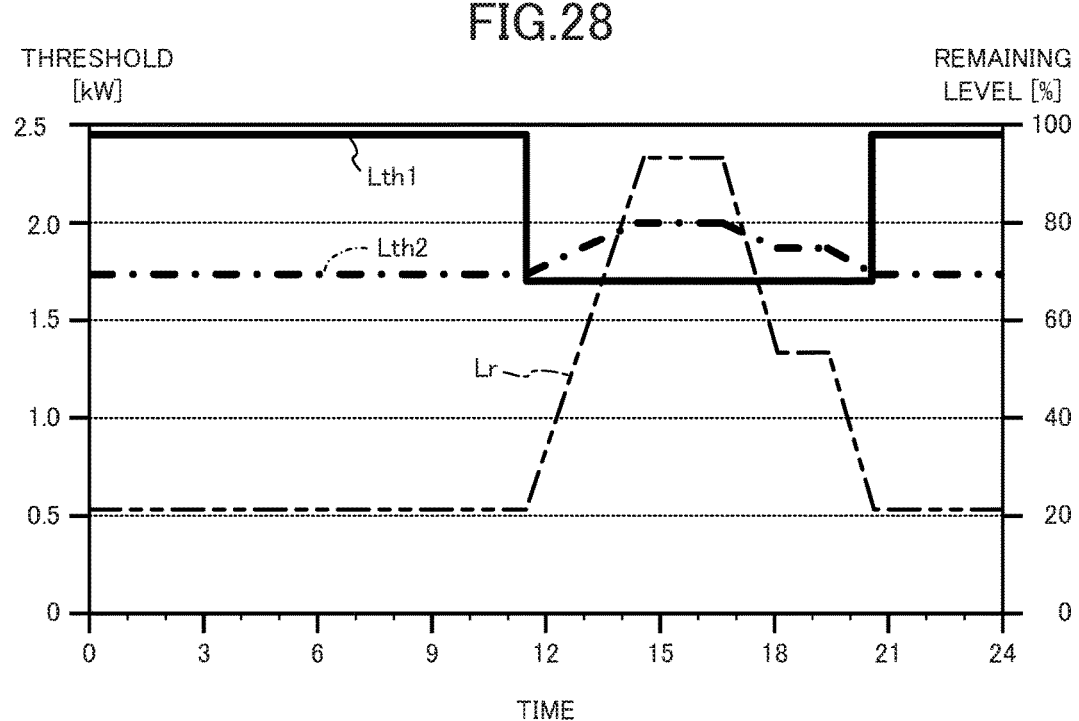
FIG. 28 is a chart for describing the threshold according to Embodiment 6.

FIG. 28 illustrates the relationship between the remaining level of the storage battery 11 and the thresholds for defining the discharge condition and charge condition. A line Lr in FIG. 28 represents the remaining level (%) of the storage battery 11. Moreover, a line Lth1 represents the threshold (kW) for defining the discharge condition and a line Lth2 represents the threshold (kW) for defining the charge condition.

As illustrated in FIG. 28, the threshold for defining the discharge condition is low when the remaining level of the storage battery 11 is high and significantly high when the remaining level is low. As a result, the power stored in the storage battery 11 is barely supplied to the load devices 61 and 62 when the remaining level is low, thereby enabling prevention of discharge of the electricity storage apparatus 10 at a low conversion efficiency.

Moreover, as illustrated in FIG. 28, the threshold for defining the charge condition is high when the remaining level of the storage battery 11 is high and low when the remaining level is low. As a result, unnecessary further charging while sufficient power is stored in the storage battery 11 can be prevented.

Embodiment 7

Embodiment 7 is described hereafter with a focus on the differences from the above-described Embodiment 1. Here, the same or equivalent components as those in Embodiment 1 are referred to by equivalent reference numbers and their descriptions are omitted or simplified.

The charge condition according to this embodiment is different from that of Embodiment 1 in that the charge condition is satisfied when the value of the surplus power falls below a threshold. For example, the charge condition according to this embodiment is satisfied when the value of the power supplied to the electricity storage apparatus 10 falls below a threshold of 1700 W.

For example, when the transition of the total power of the load devices 61 and 62 and the transition of the power generation of the power generation apparatus 20 are projected by the projector 53 as illustrated in FIG. 13, the value of the surplus power exceeds the threshold approximately from 11:30 to 14:30. However, as illustrated in FIG. 29, it is understood that the value of the surplus power represented by a line Li falls below the threshold from 11:30 to 14:30 by changing the operation schedule D4 of the water boiling operation of the load device 61 from between 2:00 and 6:00 to between 9:00 and 16:00.

Figure 29:
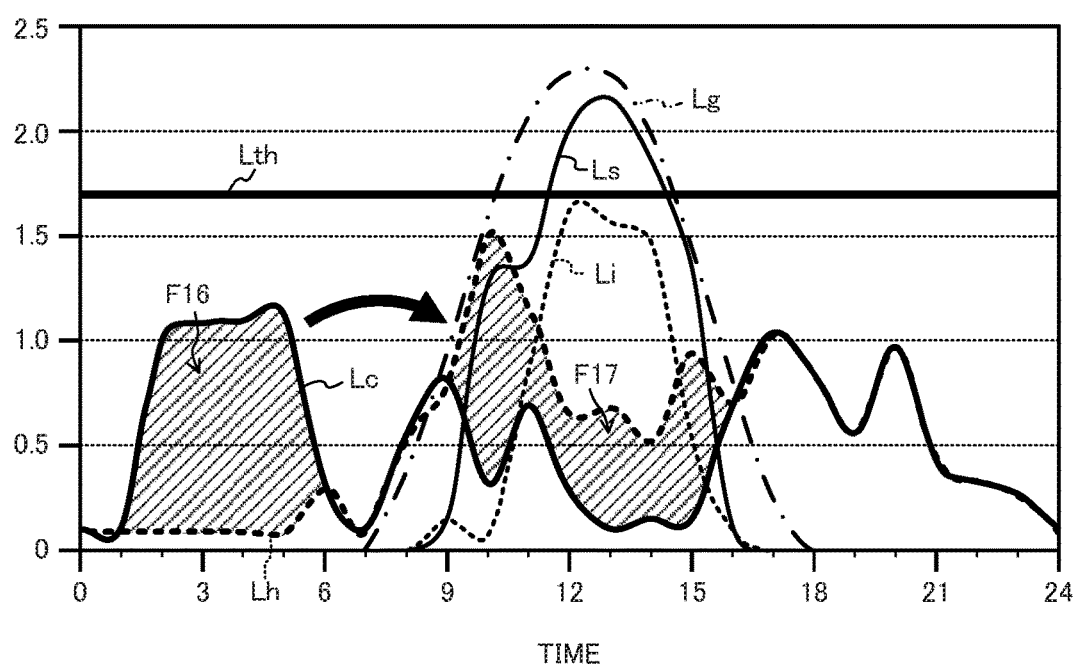
FIG. 29 is a chart for describing an operation schedule change according to Embodiment 7.

Here, lines Lh and Li in FIG. 29 represent the transition of the total power and the transition of the surplus power, respectively, when the operation schedule D4 is changed. Moreover, hatched fields F16 and F17 represent electrical energy used for the water boiling operation of the load device 61 before and after the operation schedule D4 is changed, respectively. A thick arrow represents the shift of electrical energy used for the water boiling operation.

If the operation schedule D4 is changed by the device controller 51 as illustrated in FIG. 29, the charge condition is satisfied between 11:30 and 14:30 as well when the value of the surplus power is a positive value, thereby enabling the storage battery 11 to be charged while preventing significantly high power from entering the electricity storage apparatus 10. Hence, deterioration of the electricity storage apparatus 10 and storage battery 11 due to a large current flowing can be suppressed and the efficiency in operating the electricity storage apparatus 10 can be improved. Therefore, it is desirable that the value of the threshold corresponds to the power at a level that does not deteriorate the storage battery 11 and the like, and is predetermined in accordance with the properties of the storage battery 11 and the like.

Here, a case in which the operation schedule D4 is changed so that the value of the surplus power falls below a threshold of 1700 W is described above. However, this is not restrictive. For example, the current operation states of the load devices 61 and 62 may be controlled so as to satisfy the charge condition. Moreover, the charge condition according to Embodiment 1 and the charge condition according to this embodiment may be combined. Specifically, the charge condition may be satisfied when the value of the surplus power exceeds a first threshold and falls below a second threshold higher than the first threshold. With such a charge condition being set, the power supplied to the electricity storage apparatus 10 can be converted at a somewhat high conversion efficiency and the storage battery 11 can be charged while preventing deterioration of the storage battery 11 and the like.

Embodiment 8

Embodiment 8 is described hereafter with a focus on the differences from the above-described Embodiment 3. Here, the same or equivalent components as those in Embodiment 3 are referred to by equivalent reference numbers and their descriptions are omitted or simplified.

The discharge condition according to this embodiment is different from that of Embodiment 3 in that the discharge condition is satisfied when the value of the total power of the load devices 61 and 62 falls below a threshold. For example, the discharge condition according to this embodiment is satisfied when the value of the total power falls below a threshold of 700 W.

Figure 30:
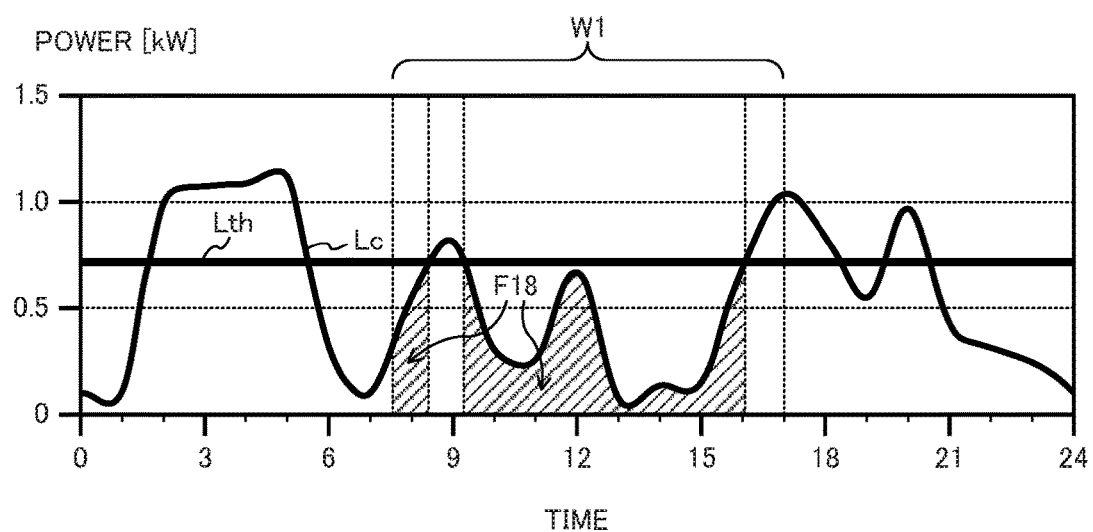
FIG. 30 is a chart illustrating the transition of the total power projected by the projector according to Embodiment 8.

Moreover, this embodiment is different from Embodiment 3 in that the time when the storage battery 11 is discharged is limited. A time period W1 in FIG. 30 represents an exemplary time between 7:30 and 17:00 during which the storage battery 11 can be discharged. The storage battery 11 is discharged only when the discharge condition is satisfied during this time period W1.

When the transition of the total power of the load devices 61 and 62 is projected by the projector 53 as illustrated in FIG. 30, electrical energy represented by a hatched field F18 is output from the electricity storage apparatus 10 through discharge of the storage battery 11.

In the case illustrated in FIG. 30, the total power exceeds the threshold around 9:00. If it is determined that the total power around 9:00 can be suppressed to fall below the threshold by changing the operation schedule D4, the device controller 51 changes the operation schedule D4.

As a result, significantly high power can be prevented from being output from the electricity storage apparatus 10 while discharging the storage battery 11 when the discharge condition is satisfied by changing the operation schedule D4. Hence, deterioration of the electricity storage apparatus 10 and storage battery 11 due to a significantly large current flowing can be suppressed.

Here, a case in which the operation schedule D4 is changed so that the value of the total power falls below a threshold of 700 W is described above. However, this is not restrictive. For example, the current operation states of the load devices 61 and 62 may be controlled so as to satisfy the discharge condition. Moreover, the discharge condition according to Embodiment 3 and the discharge condition according to this embodiment may be combined. Specifically, the discharge condition may be satisfied when the value of the total power exceeds a first threshold and falls below a second threshold higher than the first threshold. With such a discharge condition being set, the power stored in the storage battery 11 can be converted at a somewhat high conversion efficiency and power to the load devices 61 and 62 can be supplied while preventing deterioration of the storage battery 11 and the like.

Embodiment 9

Embodiment 9 is described hereafter with a focus on the differences from the above-described Embodiment 1. Here, the same or equivalent components as those in Embodiment 1 are referred to by equivalent reference numbers and their descriptions are omitted or simplified.

The discharge condition and charge condition according to this embodiment are different from that of Embodiment 1 in that the discharge condition and charge condition are satisfied in accordance with the number of times of discharging/charging of the electricity storage apparatus 20 in a specific time period. For example, the conditions according to this embodiment are satisfied when the total number of times of charging and discharging is three or less in the time period W1 set as in Embodiment 8. The time period W1 is set for discharging the power in an amount to fill the deficit so as not to purchase power and for appropriating the surplus power for charging during the day when the electricity billing rate of the commercial power source PS is relatively high.

Figure 31:
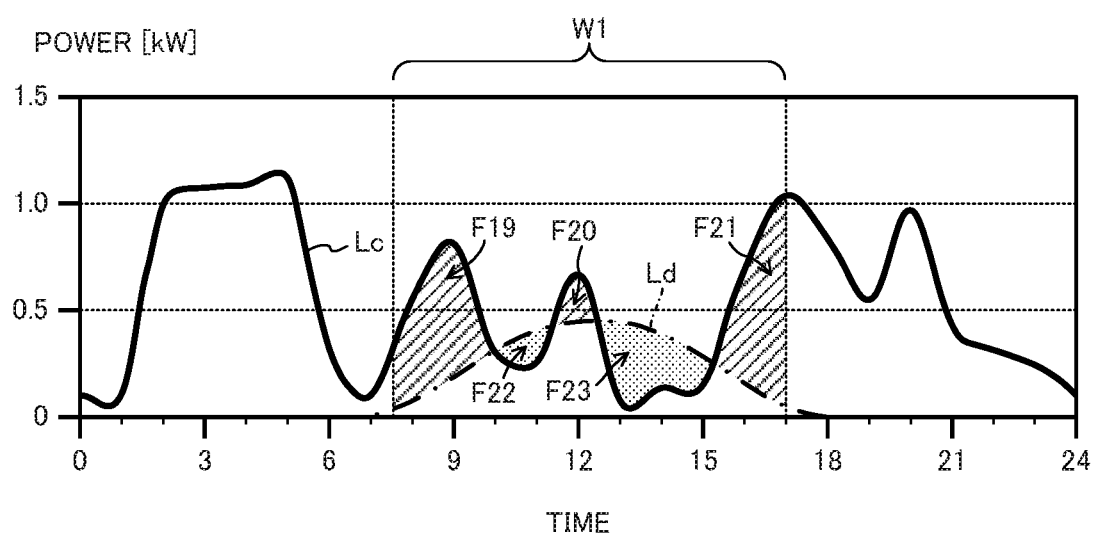
FIG. 31 is a chart illustrating the transitions of the total power and power generation projected by the projector according to Embodiment 9.

FIG. 31 illustrates the results of the projector 53 projecting the transition of the total power of the load devices 61 and 62 and the transition of the power generation of the power generation apparatus 20. In this embodiment, for easier understanding of the descriptions, the thresholds of the discharge condition and charge condition are zero. In other words, the condition regarding the power value for satisfying the discharge condition is that the value obtained by subtracting the power generation from the total power is a positive value. Moreover, the condition regarding the power value for satisfying the charge condition is that the surplus power has a positive value.

In FIG. 31, hatched fields F19, F20, and F21 represent electrical energy output from the electricity storage apparatus 10 through discharge of the storage battery 11. Moreover, hatched fields F22 and F23 represent electrical energy supplied to the electricity storage apparatus 20 and used for charging the storage battery 11. In the case illustrated in FIG. 31, the number of times of discharging in the time period W1 is three and the number of times of charging is two. The total number of times of charging/discharging is five; therefore, the condition is not satisfied.

Figure 32:
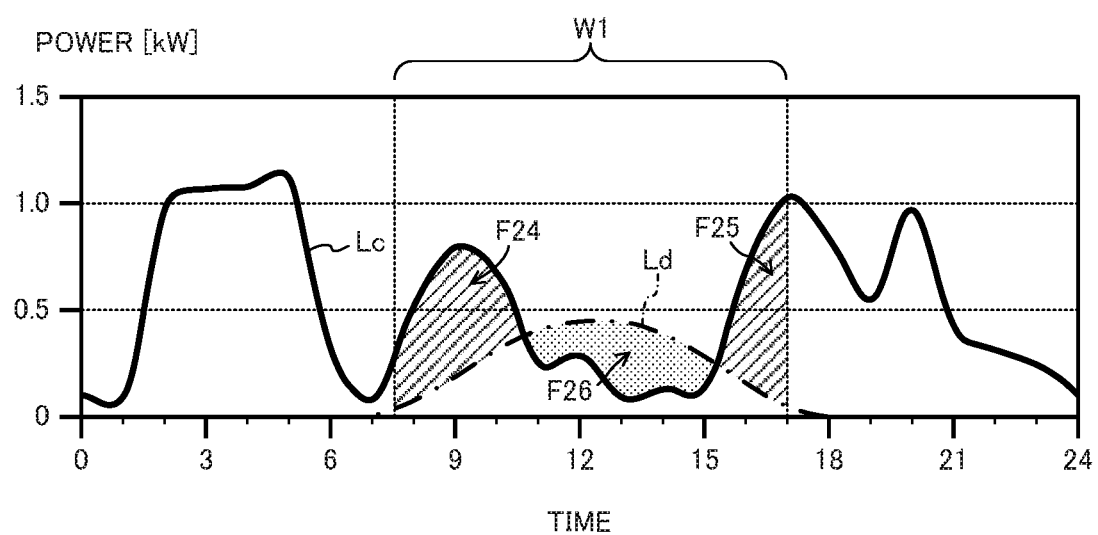
FIG. 32 is a chart for describing changing of the operation schedule so as to satisfy a condition.

However, if the total power and power generation make transitions as illustrated in FIG. 32 by changing the operation schedule D4, the number of times of discharging is two, which corresponds to fields F24 and F25, and the number of times of charging is one, which corresponds to a field F26. Therefore, the total number of times of charging/discharging is three, and thus the condition is satisfied. Then, the device controller 51 changes the operation schedule D4 so that the total power performs a transition as illustrated in FIG. 31. Specifically, when any time slot included in a specific time period is selected in the Step S6 (see FIG. 6), the device controller 51 changes the operation schedule D4 as illustrated in FIG. 31. As a result, the number of times of charging/discharging is reduced and thus deterioration of the storage battery 11 due to repeated switching between charging and discharging in a short time can be prevented.

Here, a case in which the condition is satisfied in accordance with the total number of times of charging/discharging in a time period W1 is described above. However, this is not restrictive. For example, the discharge condition may be satisfied in accordance with the number of times of discharging regardless of the number of times of charging in a specific time period. Moreover, the charge condition may be satisfied in accordance with the number of times of charging regardless of the number of times of discharging in a specific time period. Moreover, with a certain length of time up to the current time being set as the specific time period, the current operation states of the load devices 61 and 62 may be controlled so as to satisfy the condition in accordance with the number of times of charging/discharging in the specific time period.

Moreover, a case in which the number of times of charging/discharging is adjusted as a result of defining the discharge condition and charge condition using the number of times of charging/discharging is described above. However, this is not restrictive. For example, the processor 501 may change the operation schedule D4 so as to reduce the number of times of charging/discharging as much as possible while the discharge condition and charge condition are defined in accordance with the power value regardless of the number of times of charging/discharging. In other words, the device controller 51 may change the operation schedule D4 so as to reduce the number of times of charging/discharging based on the transitions of the projected values of the total power and power generation that are projected by the projector 53.

Embodiments of the present disclosure are described above. However, the present disclosure is not restricted to the above-described embodiments.

For example, there may be three or more devices consuming the power. Moreover, one of the load devices 61 and 62 may be a device that is not controlled by the control apparatus 50.

Moreover, the load devices 61 and 62 controlled by the control apparatus 50 may be devices other than electrical water heaters and air-conditioning devices. For example, the control apparatus 50 may control a device having a battery. A device having a battery may possibly be a notebook personal computer, portable terminal connected to a mobile communication network, electrical shaver, cleaning robot, or the like. In which case, the control apparatus 50 may change the scheduled time of charging the device as the operation schedule D4 of the device having a battery.

Moreover, the control apparatus 50 may control a rice cooker and change the scheduled time of cooking rice as the operation schedule D4 of the rice cooker. Moreover, the control apparatus 50 may control a household electrical appliance such as a washing machine or dish washer and change the scheduled operation time of exerting the function of the household electrical appliance.

Moreover, in changing the operation schedule D4 of the load devices 61 and 62, the control apparatus 50 may simply shift the scheduled operation start time and end time of the electrical devices 61 and 62 or take into account the power consumption occurring before and after the operation in association with the shift. For example, when a rice cooking operation is scheduled to finish immediately before a meal as the operation schedule D4 of a rice cooker, the keep-warm operation may be necessary from the time the rice cooking operation is finished until the meal starts, if the finish time of the rice cooking is expedited.

Moreover, the power generation apparatus 20 is not restricted to a device generating power from sunlight, and may be a device generating power from wind force, water force, geothermal heat, or the like, or a device generating power using fuel cells.

Moreover, the device power data D2 may be pre-stored in the auxiliary storage 503 before shipping the control apparatus 50 or the control apparatus 50 may acquire the device power data D2 from the load devices 61 and 62 when connected to each of the load devices 61 and 62. Furthermore, the control apparatus 50 may acquire the device power data D2 from the load devices 61 and 62 when necessary and store the device power data D2 in the main storage 502, not in the auxiliary storage 503.

Moreover, in the above-described Embodiment 4, the threshold is set according to the electricity billing rate. The threshold may be set as appropriate so that the cost on the electricity bill is lower when the charging/discharging is preformed than when the charging/discharging is not performed. For example, the threshold may be set so that the discharging is performed only when the electricity bill is lower in the case of purchasing power (Po+Pp) during hours in which the electricity billing rate is low than in the case of purchasing Po at the current time wherein Po is the power consumption at the current time and Pp is the power loss that occurs when the Po is supplied to the load devices 61 and 62 from the storage battery 11.

Furthermore, the threshold may be set so that the charging is performed only when the electricity bill is lower in the case of purchasing (Pi−Pj) during hours in which the electricity billing rate is low than in the case of selling Pi at the current time wherein Pi is the surplus power at the current time and Pj is the power loss that occurs when the Pi is once stored in the storage battery 11 and then supplied to the load devices 61 and 62.

Moreover, the control apparatus 50 may not order the electricity storage apparatus 10 to charge/discharge the storage battery 11. In other words, the electricity storage apparatus 10 may autonomously charge/discharge the storage battery 11 independent of the control apparatus 50.

Moreover, the method of projecting the total power and power generation is not restricted to the above-described in the embodiments. The control apparatus 50 may acquire data from a server on the Internet and project the transitions of the total power and power generation based on the acquired data. For example, when data representing a typical transition of the power consumption corresponding to the type of family structure is recorded in a server on the Internet, the transition of the total power can be projected even if the history data D3 is not accumulated in the auxiliary storage 503. Furthermore, the operation schedule D4 and device power data D2 may be combined to project the transition of the total power. Moreover, when data representing the next day's weather forecast are recorded in a server on the Internet, the accuracy of projection of the power generation can be improved. The transition of the power generation may be projected based only on weather forecast acquired from an external server.

Moreover, in the above-described embodiments, for easier understanding of the descriptions, simple operation states are assumed for the load devices 61 and 62. These operation states may be further divided or more detailed operation states may be defined. For example, the control apparatus 50 may control the operation state of the load device 62 by changing the target temperature of the air-conditioning operation of the load device 62 from 28° C. to 25° C.

Moreover, the projector 53 of the control apparatus 50 projects the transitions of the total power and power generation over 24 hours of the next day every day. However, this is not restrictive. For example, the projector 53 may project the transitions of the total power and power generation over approximately 30 days of the next month on the last day of each month.

Moreover, the control apparatus 50 divides 24 hours of the next day into one-hour time slots. However, this is not restrictive. For example, the control apparatus 50 may divide 24 hours of the next day into one-minute or one-second time slots and execute the schedule change procedure on the basis of those time slots.

Moreover, the power monitoring apparatus 40 measures the total power using the current transformers C61 and C62. However, the power monitoring apparatus 40 may measure the total power using a single current transformer.

Moreover, in the above-described embodiments, the device controller 51 directly uses the projection results of the projector 53. However, this is not restrictive. For example, it may be possible that the projector 53 stores projection results in the auxiliary storage 503 and the device controller 51 reads the projection results from the auxiliary storage 503. Furthermore, in the above-described embodiments, the control apparatus 50 includes the projector 53. However, this is not restrictive. For example, the control apparatus 50 may acquire the projection results from an external apparatus having the function equivalent to the projector 53 through communication.

The function of the control apparatus 50 according to the above-described embodiments can be realized by dedicated hardware or a conventional computer system.

For example, the functional configuration of the control apparatus 50 is not restricted to the one illustrated in FIG. 1. For example, the functional configuration illustrated in FIG. 33 may be implemented by a software module or a hardware circuit.

Figure 33:
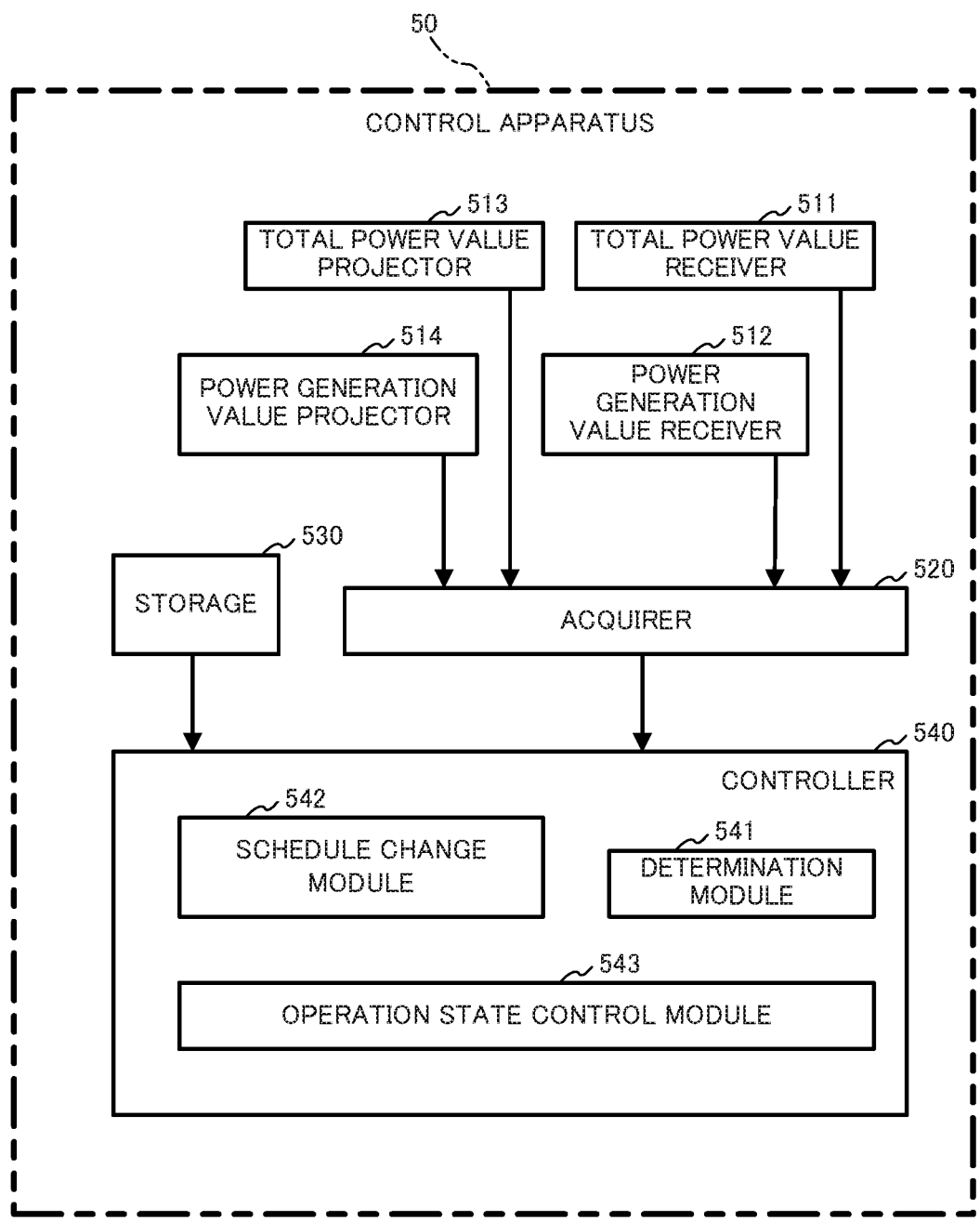
FIG. 33 is a block diagram illustrating the functional configuration of the control apparatus.

A total power value receiver 511 and power generation value receiver 512 in FIG. 33 correspond to the power monitor 52 in FIG. 1. The total power value receiver 511 receives a measurement value of the total power of the load devices 61 and 62, and the power generation value receiver 512 receives a measurement value of the power generation of the power generation apparatus 20. Moreover, a total power value projector 513 and power generation value projector 514 correspond to the projector 53 in FIG. 1. The total power value projector 513 projects the transition of the total power of the load devices 61 and 62, and the power generation value projector 514 projects the transition of the power generation of the power generation apparatus 20.

An acquirer 520 in FIG. 33 acquires the measurement value of the total power from the total power value receiver 511 and acquires the measurement value of the power generation from the power generation value receiver 512. Moreover, the acquirer 520 acquires a projected value of the total power from the total power value projector 513 and acquires a projected value of the power generation from the power generation value projector 514. Moreover, the acquirer 520 acquires the transitions of the projected values from the total power value projector 513 and power generation value projector 514 in some cases. The acquirer 520 outputs various acquired data to a controller 540. The acquirer 520 corresponds to the communicator 506 in FIG. 3 or an interface module with the internal bus in the processor 501.

A storage 530 in FIG. 33 corresponds to the auxiliary storage 503 in FIG. 3.

The controller 540 in FIG. 33 corresponds to the processor 501 in FIG. 3. The controller 540 includes a determination module 541 that determines whether the discharge condition and charge condition are satisfied, a schedule change module 542 that changes the operation schedule D4 so as to satisfy the discharge condition or charge condition, and an operation state control module 543 that controls the operation states of the load devices 61 and 62. When the values of the total power and power generation acquired by the acquirer 520 do not satisfy the discharge condition, the controller 540 controls the load devices 61 and 62 to change the power consumption of the load devices 61 and 62 so as to change the value of the total power consumption to a value satisfying the discharge condition. Moreover, when the value of the surplus power obtained from the values of the total power and power generation acquired by the acquirer 520 does not satisfy the charge condition, the controller 540 controls the load devices 61 and 62 to change the power consumption of the load devices 61 and 62 so as to change the value of the surplus power to a value satisfying the charge condition.

The operation state control module 543 executes the discharge procedure illustrated in FIG. 7 and the charge procedure illustrated in FIG. 10. Specifically, the operation state control module 543 changes the operation schedule D4 to control the current operation states of the load devices 61 and 62. Moreover, the schedule change module 542 executes the schedule change procedure illustrated in FIG. 14. Specifically, the schedule change module 542 changes the operation schedule D4 to control the future operation states of the load devices 61 and 62.

Furthermore, it is possible to configure an apparatus executing the above-described procedures by storing and distributing the programs P1 stored in the auxiliary storage 503 on a non-transitory computer readable recording medium such as a flexible disk, compact disc read-only memory (CD-ROM), digital versatile disc (DVD), or magneto-optical disk (MO), and installing the programs P1 on a computer.

Moreover, the programs P1 may be stored in a disk device or the like of a server unit on a communication network such as the Internet and, for example, superimposed on carrier waves and then downloaded to a computer.

Moreover, the above-described procedures can be accomplished by activating and executing the programs P1 while transferring the same via a network such as the Internet.

Moreover, the above-described procedures can be accomplished by executing some or all of the programs P1 on a server unit so that a computer executes the programs P1 while transmitting/receiving information regarding that processing via a communication network.

Here, when the above functions are realized by an operating system (OS) in part or by cooperation of an OS and applications, only the non-OS portion may be stored and distributed on a medium or downloaded to a computer.

Moreover, the means for realizing the function of the control apparatus 50 is not restricted to software and may be realized in part or entirely by a dedicated piece of hardware (such as a circuit). For example, if the device controller 51, the power monitor 52, and the projector 53 are configured by a field programmable gate array (FPGA) or application specific integrated circuit (ASIC), the control apparatus 50 can be a power-saving apparatus.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present application is based on International Application No. PCT/JP2014/60834 filed on Apr. 16, 2014, of which the specification, scope of claims, and drawings are entirely incorporated herein by reference.

INDUSTRIAL APPLICABILITY

The control apparatus, control system, control method, and program of the present disclosure are suitable for efficient use of electrical energy.

REFERENCE SIGNS LIST

100 Control system
10 Electricity storage apparatus
11 Storage battery
12, 22 Power conditioner 121 Voltage transformer
122 Power converter
123 Charge/discharge controller
124 Power monitor
125 Stand-alone operation switching board
20 Power generation apparatus
21 Solar panel
30 Distribution board
40 Power monitoring apparatus
50 Control apparatus
51 Device controller
52 Power monitor
53 Projector
501 Processor
502 Main storage
503 Auxiliary storage
504 Input device
505 Output device
506 Communicator
507 Timer
511 Total power value receiver
512 Power generation value receiver
513 Total power value projector
514 Power generation value projector
520 Acquirer
530 Storage
540 Controller
541 Determination module
542 Schedule change module
543 Operation state control module
61, 62 Load device
A10, A20, D10, D20 Power line
C20, C61, C62, C122 Current transformer
D1 Condition data
D2 Device power data
D3 History data
D4 Operation schedule
D5 Family calendar
F1 to F26 Field
H1 Home
Lc, Ld, Le, Lf, Lg, Lh, Li, Lr, Ls, L61, Lth, Lth1, Lth2 Line
P1 Programs
PS Commercial power source
W1 Time period

The invention claimed is:

1. A control apparatus for controlling a control target device among a plurality of electrical devices for which supply of power from an electricity storage apparatus is controlled based on a total power consumption of the plurality of electrical devices, the control apparatus comprising:
   a memory; and
   a hardware processor coupled to the memory, the processor performs operations to:
      acquire a value of the total power consumption of the plurality of electrical devices,
      determine that the value of the total power consumption is greater than a current power generation of the electricity storage apparatus, and
      compare a remaining level of power of the electricity storage apparatus with a first threshold, wherein when the remaining level of power of the electricity storage apparatus is not equal to or greater than the first threshold then the processor controls the electricity storage apparatus to supply power to the electrical devices from to a commercial power source, and wherein when the remaining level of power of the electricity storage apparatus is equal to or greater than the first threshold then the processor controls the control target device to satisfy a predetermined discharge condition and starts discharging the electricity storage apparatus.

2. The control apparatus according to claim 1, wherein the processor further performs operations to
   store an operation schedule indicating a scheduled operation state of the plurality of electrical devices,
   acquire a projected value of the total power consumption,
   determine that the predetermined discharge condition is not satisfied by the operation schedule,
   determine that the predetermined discharge condition will be satisfied by changing the operation schedule,
   change the operation schedule and
   control the plurality of electrical devices based on the changed operation schedule after the operation schedule is changed.

3. The control apparatus according, to claim 2, wherein the processor further performs operations to
   store a user schedule, and
   change the operation schedule based on the stored user schedule.

4. The control apparatus according to claim 2, wherein the processor further performs operations to
   select a time slot of a plurality of time slots prior to determining that the predetermined discharge condition is not satisfied by the operation schedule, and
   determine that all of the plurality of time slots have been selected prior to controlling the plurality of electrical devices based on the changed operation schedule.

5. The control apparatus according to claim 1, wherein the processor further performs operations to
   notify a user that the control target device is to be controlled prior to controlling the target device to satisfy the predetermined discharge condition.

6. The control apparatus according to claim 1, wherein the processor further performs operations to
   control the control target device after obtaining permission from a user.

7. The control apparatus according to claim 1, wherein the electricity storage apparatus supplies power to, the plurality of electrical devices when the value of the total power consumption exceeds a second threshold, and the second threshold is a value based on a conversion efficiency at which the electricity storage apparatus converts direct-current power to alternating-current power to supply the alternating-current power to the plurality of electrical devices.

8. The control apparatus according to claim 1, wherein the electricity storage apparatus supplies power to the plurality of electrical devices when the value of the total power consumption exceeds a second threshold, and the second threshold is a value based on an electricity billing rate of the commercial power source to which the electricity storage apparatus is connected.

9. A control apparatus for controlling a control target device among a plurality of electrical devices supplied with power generated by a power generation apparatus and an electricity storage apparatus, the control apparatus comprising:
   a memory; and
   a hardware processor coupled to the memory, the processor performs operations to:
      acquire a value of a total power consumption of the plurality of electrical devices:
      acquire a value of the power generation;

determine that the value of the total power consumption is not greater than the value of the power generation; and compare a remaining level of power of the electricity storage apparatus with a first threshold, wherein when the remaining level of power of the electricity storage apparatus is not equal to or lower than the first threshold then the processor controls the electricity storage apparatus to sell surplus power to a commercial power source, and wherein when the remaining level of power of the electricity storage apparatus is equal to or lower than the first threshold then the processor controls the control target device to satisfy a predetermined charge condition and starts charging the electricity storage apparatus.

10. The control apparatus according to claim 9, wherein the processor further performs operations to store an operation schedule indicating a scheduled operation state of the plurality of electrical devices;

acquire a projected value of the total power consumption;

acquire a projected value of the power generation;

determine that the predetermined charge condition is not satisfied by the operation schedule;

determine that the predetermined charge condition will be satisfied by changing the operation schedule, change the operation schedule; and control the plurality of electrical devices based on the changed operation schedule after the operation schedule is changed.

11. The control apparatus according to claim 10, wherein the processor further performs operations to determine that the predetermined charge condition is satisfied by the operation schedule and that the surplus power exists;

determine that at least one of the electrical devices is operable with the surplus power by changing the operation schedule;

change the operation schedule; and control the plurality of electrical devices based on the changed operation schedule.

12. The control apparatus according to claim 9, wherein the electricity storage apparatus stores the surplus power when the value of the surplus power exceeds a second threshold, and the second threshold is a value based on a conversion efficiency at which the electricity storage apparatus converts alternating-current power to direct-current power to store the direct-current power.

13. A control system, comprising:

an electricity storage apparatus of which power supply to a plurality of electrical devices is controlled based on a total power consumption of the plurality of electrical devices;

a control target device that is a control target among the plurality of electrical devices; and a control apparatus configured to control the control target device, wherein the control apparatus comprises:

a memory; and a hardware processor coupled to the memory, the processor performs operations to:

acquire a value of the total power consumption;

determine that the value of the total power consumption is greater than a current power generation of the electricity storage apparatus, and compare a remaining level of power of the electricity storage apparatus with a threshold, wherein when the remaining level of power of the electricity storage apparatus is not equal to or greater than the threshold then the processor controls the electricity storage apparatus to supply power to the electrical devices from a commercial power source, and wherein when the remaining level of power of the electricity storage apparatus is equal to or greater than the threshold then the processor controls the control target device to satisfy a predetermined discharge condition and starts discharging the electricity storage apparatus.

14. A control system, comprising:

a power generation apparatus;

an electricity storage apparatus;

a control target device that is a control target among a plurality of electrical devices supplied with power generated by the power generation apparatus and the electricity storage apparatus; and a control apparatus configured to control the control target device, wherein the control apparatus comprises:

a memory; and a hardware processor coupled to the memory, the processor performs operations to:

acquire a value of a total power consumption of the plurality of electrical devices;

acquire a value of the power generation;

determine that the value of the total power consumption is not greater than the value of the power generation; and compare a remaining level of power of the electricity storage apparatus with a threshold, wherein when the remaining level or power of the electricity storage apparatus is not equal to or lower than the threshold than the processor controls the electricity storage apparatus to sell surplus power to a commercial power source, and wherein when the remaining level of power of the electricity storage apparatus is equal to or lower than the threshold then the processor controls the control target device to satisfy a predetermined charge condition and starts charging the electricity storage apparatus.

15. A control method for controlling a control target device among a plurality of electrical devices for Which supply of power from an electricity storage apparatus is controlled based on a total power consumption of the plurality of electrical devices, the control method comprising:

acquiring a value of the total power consumption of the plurality of electrical devices;

determining that that the value of the total power consumption is greater than a current power generation of the electricity storage apparatus, and comparing a remaining level of power of the electricity storage apparatus with a threshold, wherein when the remaining level of power of the electricity storage apparatus is not equal to or greater than the threshold then controlling the electricity storage apparatus to supply power to the electrical devices from a commercial power source, and wherein when the remaining level of power of the electricity storage apparatus is equal to or greater than the threshold then controlling the control target device to satisfy a predetermined discharge condition and starting discharging of the electrical storage apparatus.

16. A control method for controlling a control target device among a plurality of electrical devices supplied with power generated by a power generation apparatus and an electricity storage apparatus, the control method comprising:

acquiring a value of a total power consumption of the plurality of electrical devices;

acquiring a value of the power generation;

determining that the value of the total power consumption is not greater than the value of the power generation; and comparing a remaining level of power of the electricity storage apparatus with a threshold, wherein when the remaining level of power of the electricity storage apparatus is not equal to or lower than the threshold then controlling the electricity storage apparatus to sell surplus power to a commercial power source, and wherein when the remaining level of power of the electricity storage apparatus is equal to or lower than the threshold then controlling the control target device to satisfy a predetermined charge condition and starting charging of the electricity storage apparatus.

17. A non-transitory computer-readable recording medium storing a program for executing the method of claim 15.

18. A non-transitory computer-readable recording medium storing a program for executing the method of claim 16.

\* \* \* \* \*